United States Patent
Wang et al.

(10) Patent No.: US 9,493,232 B2
(45) Date of Patent: *Nov. 15, 2016

(54) REMOTE CONTROL METHOD AND TERMINAL

(71) Applicant: SZ DJI TECHNOLOGY Co., Ltd, Shenzhen (CN)

(72) Inventors: Tao Wang, Shenzhen (CN); Mingyu Wang, Shenzhen (CN)

(73) Assignee: SZ DJI Technology Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/977,406

(22) Filed: Dec. 21, 2015

(65) Prior Publication Data

US 2016/0159463 A1 Jun. 9, 2016

Related U.S. Application Data

(63) Continuation of application No. 14/670,107, filed on Mar. 26, 2015, which is a continuation of application
(Continued)

(30) Foreign Application Priority Data

Jul. 31, 2013 (CN) .......................... 2013 1 0330321

(51) Int. Cl.
*B64C 19/00* (2006.01)
*B64C 39/02* (2006.01)
(Continued)

(52) U.S. Cl.
CPC .............. *B64C 19/00* (2013.01); *B64C 39/024* (2013.01); *B64D 47/08* (2013.01); *G05D 1/0016* (2013.01);
(Continued)

(58) Field of Classification Search
CPC ................ G05D 1/0016; G05D 1/0094; B64C 39/024; B64D 47/08
See application file for complete search history.

(56) References Cited

U.S. PATENT DOCUMENTS

| | | | |
|---|---|---|---|
| 3,523,660 | A | 8/1970 | Attebery et al. |
| 3,564,134 | A | 2/1971 | Rue et al. |

(Continued)

FOREIGN PATENT DOCUMENTS

| | | |
|---|---|---|
| CN | 101093733 A | 12/2007 |
| CN | 201002722 Y | 1/2008 |

(Continued)

OTHER PUBLICATIONS

Office action dated Mar. 24, 2016 for U.S. Appl. No. 14/984,348.
(Continued)

*Primary Examiner* — Thomas G Black
*Assistant Examiner* — Peter D Nolan
(74) *Attorney, Agent, or Firm* — Wilson Sonsini Goodrich & Rosati

(57) ABSTRACT

The present application discloses a remote control method and apparatus for controlling the state of a movable object and/or a load carried thereon. The remote control method comprising: receiving, via an apparatus, a state signal that corresponds to a user's position; remote-controlling the state of the a load being carried on a movable object based on the state signal; wherein the state of the load is the result of combining the movement of the load relative to the movable object and the movement of the object relative to its environment. For example, the control of the state can be achieved through the state of the apparatus itself, a user's state captured by an apparatus, a graphical interface on a screen of an apparatus, or a voice command.

30 Claims, 17 Drawing Sheets

Related U.S. Application Data

No. 14/537,610, filed on Nov. 10, 2014, which is a continuation of application No. 14/179,078, filed on Feb. 12, 2014, now Pat. No. 8,903,568, which is a continuation of application No. PCT/CN2014/071938, filed on Feb. 10, 2014, which is a continuation-in-part of application No. PCT/CN2013/080721, filed on Aug. 2, 2013.

(51) Int. Cl.
| | | |
|---|---|---|
| G05D 1/00 | (2006.01) | |
| G06F 3/0488 | (2013.01) | |
| B64D 47/08 | (2006.01) | |

(52) U.S. Cl.
CPC .......... *G05D 1/0038* (2013.01); *G05D 1/0094* (2013.01); *G06F 3/04883* (2013.01); *B64C 2201/123* (2013.01); *B64C 2201/127* (2013.01); *B64C 2201/146* (2013.01)

(56) References Cited

U.S. PATENT DOCUMENTS

| | | | |
|---|---|---|---|
| 3,617,016 A | 11/1971 | Bolsey | |
| 3,638,502 A | 2/1972 | Leavitt et al. | |
| 4,752,791 A | 6/1988 | Allred | |
| 5,124,938 A | 6/1992 | Algrain | |
| 5,426,476 A | 6/1995 | Fussell et al. | |
| 5,897,223 A | 4/1999 | Tritchew et al. | |
| 5,900,925 A | 5/1999 | Navarro | |
| 5,966,991 A | 10/1999 | Gosselin et al. | |
| 6,191,842 B1 | 2/2001 | Navarro | |
| 6,584,382 B2 | 6/2003 | Karem | |
| 6,628,338 B1 | 9/2003 | Elberbaume et al. | |
| 6,999,005 B2 | 2/2006 | Okada et al. | |
| 7,000,883 B2 | 2/2006 | Mercadal et al. | |
| 7,190,097 B2 | 3/2007 | Voigt et al. | |
| 7,385,626 B2 | 6/2008 | Aggarwal et al. | |
| 7,479,949 B2 | 1/2009 | Jobs et al. | |
| 7,905,463 B2 | 3/2011 | Burnham et al. | |
| 8,087,315 B2 | 1/2012 | Goossen et al. | |
| 8,089,694 B2 | 1/2012 | Wernersson | |
| 8,140,200 B2 | 3/2012 | Heppe et al. | |
| 8,214,088 B2 | 7/2012 | Lefebure | |
| 8,434,950 B1 | 5/2013 | Wawro | |
| 8,473,125 B2 | 6/2013 | Rischmuller et al. | |
| 8,474,761 B2 | 7/2013 | Callou | |
| 8,498,447 B2 | 7/2013 | Derbanne | |
| 8,521,339 B2 | 8/2013 | Gariepy et al. | |
| 8,523,462 B2 | 9/2013 | Dimotakis | |
| 8,564,547 B2 | 10/2013 | Amireh et al. | |
| 8,581,981 B2 | 11/2013 | Alley et al. | |
| 8,635,938 B2 | 1/2014 | King et al. | |
| 8,903,568 B1 | 12/2014 | Wang et al. | |
| 8,938,160 B2 | 1/2015 | Wang | |
| 9,277,130 B2 | 3/2016 | Wang et al. | |
| 2002/0100850 A1 | 8/2002 | Shental et al. | |
| 2004/0173726 A1 | 9/2004 | Mercadal et al. | |
| 2006/0017816 A1 | 1/2006 | Gat | |
| 2006/0053912 A1 | 3/2006 | Miller | |
| 2009/0051906 A1 | 2/2009 | Carter et al. | |
| 2009/0096411 A1 | 4/2009 | Vanska et al. | |
| 2009/0212157 A1 | 8/2009 | Arlton et al. | |
| 2009/0283629 A1 | 11/2009 | Kroetsch et al. | |
| 2010/0079101 A1 | 4/2010 | Sidman | |
| 2010/0250022 A1 | 9/2010 | Hines et al. | |
| 2010/0266272 A1 | 10/2010 | Holway et al. | |
| 2011/0054689 A1 | 3/2011 | Nielsen et al. | |
| 2011/0288696 A1 | 11/2011 | Lefebure | |
| 2011/0299732 A1 | 12/2011 | Jonchery et al. | |
| 2011/0301784 A1 | 12/2011 | Oakley et al. | |
| 2011/0311099 A1 | 12/2011 | Derbanne | |
| 2012/0019660 A1* | 1/2012 | Golan | H04N 5/232 348/144 |
| 2012/0029731 A1 | 2/2012 | Waldock et al. | |
| 2012/0050524 A1 | 3/2012 | Rinner et al. | |
| 2012/0089937 A1 | 4/2012 | Hsieh et al. | |
| 2012/0105634 A1 | 5/2012 | Meidan et al. | |
| 2012/0113514 A1 | 5/2012 | Rodman | |
| 2012/0200722 A1* | 8/2012 | Kozlov | B66F 11/048 348/208.7 |
| 2012/0287274 A1 | 11/2012 | Bevirt | |
| 2012/0287284 A1 | 11/2012 | Jacobsen et al. | |
| 2012/0307042 A1 | 12/2012 | Lee et al. | |
| 2012/0316685 A1 | 12/2012 | Pettersson | |
| 2013/0026689 A1 | 1/2013 | Bloomfield et al. | |
| 2013/0109272 A1 | 5/2013 | Rindlisbacher | |
| 2013/0162822 A1 | 6/2013 | Lee et al. | |
| 2013/0173088 A1 | 7/2013 | Callou et al. | |
| 2013/0176423 A1* | 7/2013 | Rischmuller | G05D 1/0038 348/114 |
| 2013/0286233 A1 | 10/2013 | Kozlov et al. | |
| 2014/0008496 A1 | 1/2014 | Ye et al. | |
| 2014/0037278 A1 | 2/2014 | Wang | |
| 2015/0097950 A1 | 4/2015 | Wang et al. | |
| 2015/0142213 A1 | 5/2015 | Wang et al. | |
| 2015/0156385 A1 | 6/2015 | Wang | |
| 2015/0241713 A1 | 8/2015 | Laroia et al. | |
| 2015/0268666 A1 | 9/2015 | Wang et al. | |
| 2016/0119546 A1 | 4/2016 | Wang et al. | |

FOREIGN PATENT DOCUMENTS

| | | |
|---|---|---|
| CN | 201041611 Y | 3/2008 |
| CN | 101173826 A | 5/2008 |
| CN | 201287830 Y | 8/2009 |
| CN | 201380965 Y | 1/2010 |
| CN | 100590748 C | 2/2010 |
| CN | 101685235 A | 3/2010 |
| CN | 101734377 A | 6/2010 |
| CN | 101811578 A | 8/2010 |
| CN | 101817182 A | 9/2010 |
| CN | 201604796 U | 10/2010 |
| CN | 101872198 A | 12/2010 |
| CN | 102043410 A | 5/2011 |
| CN | 102348068 A | 2/2012 |
| CN | 201273910 Y | 2/2012 |
| CN | 101872198 B | 5/2012 |
| CN | 102436118 A | 5/2012 |
| CN | 102556359 A | 7/2012 |
| CN | 202392373 U | 8/2012 |
| CN | 102707734 A | 10/2012 |
| CN | 102774505 A | 11/2012 |
| CN | 103049007 A | 4/2013 |
| CN | 103426282 A | 12/2013 |
| EP | 1227671 A1 | 7/2002 |
| EP | 2356806 B1 | 5/2012 |
| FR | 2656730 A1 | 7/1991 |
| FR | 2730570 A1 | 8/1996 |
| GB | 2375173 A | 11/2002 |
| GB | 2464147 A | 4/2010 |
| JP | S 6288898 A | 4/1987 |
| JP | H 02186197 A | 7/1990 |
| JP | 2000077150 A | 3/2000 |
| JP | 200318452 A | 1/2003 |
| JP | 2004219208 A | 8/2004 |
| JP | 2004242128 A | 8/2004 |
| JP | 2005150781 A | 6/2005 |
| JP | 2008-167257 A | 7/2008 |
| JP | 2008197388 A | 8/2008 |
| JP | 200923379 A | 2/2009 |
| JP | 2010078842 A | 4/2010 |
| KR | 20100035097 A | 4/2010 |
| KR | 20120105201 A | 9/2012 |
| RU | 2369535 C1 | 10/2009 |
| TW | 201015108 A | 4/2010 |
| TW | 201344239 A | 11/2013 |
| WO | WO 2004/067432 A2 | 8/2004 |
| WO | WO 2007/033033 A2 | 3/2007 |
| WO | WO 2008/099642 A1 | 8/2008 |
| WO | WO 2008/116982 A2 | 10/2008 |
| WO | WO 2009/109711 A2 | 9/2009 |

(56) References Cited

FOREIGN PATENT DOCUMENTS

| WO | WO 2009/109711 A3 | 11/2009 |
|----|-------------------|---------|
| WO | WO 2010/063916 A1 | 6/2010  |
| WO | WO 2012/001677 A2 | 1/2012  |

OTHER PUBLICATIONS

U.S. Appl. No. 14/984,348, filed Dec. 30, 2015, Wang et al.
European search report and opinion dated May 15, 2015 for EP Application No. 11871956.6.
European search report and opinion dated May 26, 2015 for EP Application No. 11872105.9.
International search report and written opinion dated May 24, 2012 for PCT Application No. CN2011082462.
International search report and written opinion dated Jun. 14, 2012 for PCT Application No. CN2011/079703.
International search report and written opinion dated Jun. 14, 2012 for PCT Application No. CN2011/079704.
International search report and written opinion dated Jul. 16, 2014 for PCT/CN2013/084857.
International search report dated Mar. 27, 2014 for PCT/CN2013/080721.
International search report dated May 26, 2014 for PCT/CN2014/071938.
Notice of allowance dated Sep. 11, 2014 for U.S. Appl. No. 14/179,078.
Notice of allowance dated Oct. 16, 2015 for U.S. Appl. No. 14/134,375.
Notice of allowance dated Nov. 20, 2014 for U.S. Appl. No. 14/045,606.
Office action dated Mar. 12, 2015 for U.S. Appl. No. 14/564,016.
Office action dated Apr. 4, 2014 for U.S. Appl. No. 14/134,375.
Office action dated Apr. 8, 2014 for U.S. Appl. No. 14/179,078.
Office action dated Apr. 10, 2014 for U.S. Appl. No. 14/045,606.
Office action dated May 20, 2015 for U.S. Appl. No. 14/134,375.
Office action dated May 27, 2015 for U.S. Appl. No. 14/564,016.
Office action dated Jul. 17, 2014 for U.S. Appl. No. 14/134,375.
Office action dated Sep. 4, 2015 for U.S. Appl. No. 14/564,016.
Utility Model Patent Right Evaluation Report dated Aug. 24, 2013 for Patent No. ZL2011204761516 for Gyroscopic Dynamic Self-balancing PTZ.
Office action dated Feb. 22, 2016 for U.S. Appl. No. 14/564,016.
Office action dated Jun. 16, 2016 for U.S. Appl. No. 14/564,016.
Notice of allowance dated Aug. 17, 2016 for U.S. Appl. No. 14/984,348.
Krainev. Machine mechanics Fundamental Dictionary Moscow. Machinebuilding. 2000. p. 143. (in Russian with English abstract).
European search report and opinion dated Apr. 1, 2016 for EP Application No. 13895168.6.
European search report and opinion dated Apr. 25, 2016 for EP Application No. 14831287.9.

* cited by examiner

REMOTE CONTROL METHOD AND TERMINAL

CROSS-REFERENCE

This application is a continuation application of Ser. No. 14/670,107, filed on Mar. 26, 2015, which is a continuation application of U.S. patent application Ser. No. 14/537,610, filed on Nov. 10, 2014, which is a continuation application of U.S. patent application Ser. No. 14/179,078, filed on Feb. 12, 2014, now U.S. Pat. No. 8,903,568, which is a continuation application of International Application No. PCT/CN2014/071938 filed on Feb. 10, 2014, which claims priority to International Application No. PCT/CN2013/080721 filed on Aug. 2, 2013, which claims priority to Chinese Application No. CN 201310330321.3 filed on Jul. 31, 2013. The disclosures of these applications are hereby incorporated by reference in their entirety.

BACKGROUND OF THE INVENTION

In recent years, unmanned aerial vehicles (such as fixed-wing aircrafts, rotary-wing aircrafts including helicopters), motor vehicles, submarines or ships, as well as satellites, space stations, spacecrafts and the like have become widely utilized, for example, in the area of surveillance, search and rescue operations, and other fields.

These movable objects can be configured to carry payloads. The payloads may include imaging devices (cameras, video recorders, and the like), lighting devices, and other devices. Oftentimes, such payloads are directly coupled to the movable objects. In some instances, such payloads are coupled indirectly to the movable objects via carriers or mounting structures. Such carriers may include gimbal platforms. The carrier and the payload as a whole may be referred to as the load.

An aerial vehicle can be used to perform aerial photography via an aerial camera mounted on the aerial vehicle. Conventional camera's shooting angles cannot change relative to the aerial vehicle, this limiting their ability to conduct surveillance.

SUMMARY OF THE INVENTION

A need exists for a mechanism for remotely adjusting the position or posture of the payload relative to the movable object to which the payload is directly or indirectly coupled so as to improve the flexibility and functionality of such systems. The present invention addresses this need and provides related advantages as well.

This application relates to a method and a terminal that remotely controls the state of a movable object and/or a load carried thereon. Specifically, this application relates to remotely controlling the state of an aircraft, a submarine, a motor vehicle and/or a load carried thereon.

Aspects of the invention are directed to a method of controlling positioning of a payload, said method comprising: providing a payload supported by a carrier on a vehicle or living subject, wherein the payload is movable relative to the vehicle or living subject via the carrier about one or more axes of rotation; receiving, at a receiver positioned on the carrier or the vehicle, from a terminal that is remote relative to the vehicle or living subject, the carrier and the payload, a signal indicative of an attitude of the terminal; and moving the payload relative to the vehicle or living subject about the one or more axes of rotation via actuation of the carrier in response to the signal.

In some embodiments, the payload is an image capturing device. The vehicle may be an unmanned vehicle. Optionally, the unmanned vehicle can be an unmanned aerial vehicle. The vehicle may be of a volume less than 100 $cm^3$.

The terminal may be a handheld object. The signal from the terminal may be received at the receiver wirelessly. A user interface may be provided for the terminal. The method may include displaying, on the user interface, an image captured by the payload.

In some implementations, the payload is movable relative to the vehicle or living subject about a first axis of rotation and a second axis of rotation. Movement of the payload relative to the vehicle or living subject can occur in response to an additional signal indicative of an attitude of the payload. The moving of the payload relative to the vehicle or living subject may occur about one or more of the following: pitch, roll, yaw axes. The vehicle or living subject can be movable relative to a fixed reference frame about one or more of the following: pitch, roll, yaw axes.

The payload and carrier may be separable from one another. Alternatively, the payload and carrier can form an integral unit.

In accordance with additional aspects of the invention, a non-transitory computer readable medium containing program instructions for controlling positioning of a payload supported by a carrier on a vehicle or living subject, wherein the payload is movable relative to the vehicle or living subject via the carrier about one or more axes of rotation, may be provided. Said computer readable medium may comprise: program instructions for analyzing a signal indicative of an attitude of a terminal, said signal received by a receiver positioned on the carrier or the vehicle, from the terminal that is remote relative to the vehicle or living subject, the carrier and the payload; and program instructions for effecting movement of the payload relative to the vehicle or living subject about the one or more axes of rotation via actuation of the carrier in response to the analyzed signal.

Optionally, the payload can be an image capturing device. The vehicle may be an unmanned vehicle. In some cases, the unmanned vehicle is an unmanned aerial vehicle. The vehicle may be of a volume less than 100 $cm^3$.

The terminal may be a handheld object. The signal from the terminal may be received at the receiver wirelessly. A user interface may be provided for the terminal. The non-transitory computer readable medium may include program instructions for displaying, on the user interface, an image captured by the payload.

In some implementations, the payload is movable relative to the vehicle or living subject about a first axis of rotation and a second axis of rotation. Movement of the payload relative to the vehicle or living subject can occur in response to an additional signal indicative of an attitude of the payload. The moving of the payload relative to the vehicle or living subject may occur about one or more of the following: pitch, roll, yaw axes. The vehicle or living subject can be movable relative to a fixed reference frame about one or more of the following: pitch, roll, yaw axes.

The payload and carrier may be separable from one another. Alternatively, the payload and carrier can form an integral unit.

Furthermore, aspects of the invention may be directed to a carrier for positioning a payload, said carrier comprising: a frame assembly configured to be attached to a vehicle or living subject, said frame assembly further being configured to support a payload, wherein the payload is movable relative to the vehicle or living subject via actuation of the frame assembly about one or more axes of rotation; a receiver configured to receive a signal from a terminal that is remote relative to the vehicle or living subject, the frame assembly and the payload, said signal indicative of an attitude of the terminal; and one or more actuators in communication with the receiver, said one or more actuators being configured to actuate one or more portions of the frame assembly, thereby moving the payload relative to the vehicle or living subject about the one or more axes of rotation in response to the signal.

In some embodiments, the payload is an image capturing device. The vehicle may be an unmanned vehicle. Optionally, the unmanned vehicle can be an unmanned aerial vehicle. The vehicle may be of a volume less than 100 cm$^3$. The vehicle may weigh less than 15 kg.

The receiver may be configured to communicate with the terminal wirelessly. The terminal may be a handheld object.

One or more actuators may be configured to move the payload relative to the vehicle or living subject about a first axis of rotation and a second axis of rotation. The one or more actuators can be configured to move the payload relative to the vehicle or living subject in response to a signal indicative of an attitude of the payload. The one or more actuators may be configured to move the payload relative to the vehicle or living subject about one or more of the following: pitch, roll, yaw axes.

A system for controlling positioning of a payload may be provided in accordance with additional aspects of the invention. The system may comprise: a carrier on a vehicle or living subject, said carrier supporting the payload, wherein the payload is movable relative to the vehicle or living subject via the carrier about one or more axes of rotation; a terminal that is remote relative to the vehicle or living subject, the carrier and the payload, said terminal configured to provide a signal indicative of an attitude of the terminal; and one or more actuators of the carrier configured to move the payload relative to the vehicle or living subject about the one or more axes of rotation in response to the signal.

The payload may be an image capturing device. In some embodiments, the vehicle is an unmanned vehicle. The unmanned vehicle may be an unmanned aerial vehicle. The vehicle may weigh less than 15 kg.

In accordance with some implementations, the terminal is a handheld object. The terminal may communicate with the receiver wirelessly. The terminal may have a user interface. The user interface may display an image captured by the payload.

The payload may be movable relative to the vehicle or living subject about a first axis of rotation and a second axis of rotation. The one or more actuators of the carrier can be configured to move the payload relative to the vehicle or living subject in response to a signal indicative of an attitude of the payload. The payload may be movable relative to the vehicle or living subject about one or more of the following: pitch, roll, yaw axes. The vehicle or living subject may be movable relative to a fixed reference frame about one or more of the following: pitch, roll, yaw axes.

Optionally, the payload and carrier are separable from one another. Alternatively, the payload and carrier form an integral unit.

Aspects of the invention may also be directed to a method of controlling positioning of a payload, said method comprising: providing a payload supported by a carrier on a movable object, wherein the payload is rotatable relative to the movable object via the carrier about one or more axes of rotation, and the movable object is movable relative to a target; receiving, at a receiver positioned on the carrier or the movable object, from a terminal that is remote relative to the movable object, the carrier and the payload, a signal indicative of an attitude of the terminal; determining, with aid of a processor and in response to the signal (1) whether to rotate the payload relative to the movable object, and (2) whether to move the movable object relative to the target; and moving at least one of (1) the payload relative to the movable object via actuation of the carrier or (2) the movable object relative to the target, in response to said determination.

The payload may be an image capturing device and the target can be a field of view imaged by the image capturing device. The method may include controlling the size of the field of view without regard to the attitude of the terminal. The size of the field of view can be controlled via a touch interaction with a user interface displayed on the terminal.

In some embodiments, the payload is rotated relative to the target about one or more axes of rotation with aid of a motor. The one or more axes may be selected from one or more of the following: pitch, roll, or yaw axes. The movable object can be rotated relative to a target about one or more axes of rotation. The one or more axes of rotation are selected from one or more of the following: pitch, roll, yaw axes. The movable object may be moved relative to the target via actuation of one or more motors of the movable object. The actuation of the one or more motors of the movable object may cause movement of one or more rotatable blades that provide lift to the movable object.

The movable object may be an unmanned aerial vehicle.

In some embodiments, the determination is made said processor at said carrier. Alternatively, the determination can be made by said processor at said terminal. In some instances, said determination may be made by said processor at an external device in communication with the terminal and the carrier.

Aspects of the invention may provide a non-transitory computer readable medium containing program instructions for controlling positioning of a payload supported by a carrier on a movable object, wherein the payload is rotatable relative to the movable object via the carrier about one or more axes of rotation, and the movable object is movable relative to a target, said computer readable medium comprising: program instructions for analyzing a signal indicative of an attitude of a terminal, said signal received by a receiver positioned on the carrier or the movable object, from the terminal that is remote relative to the movable object, the carrier and the payload; program instructions for determining, with aid of a processor and in response to the analyzed signal (1) whether to rotate the payload relative to the movable object, and (2) whether to move the movable object relative to the target; and program instructions for effecting movement of at least one of (1) the payload relative to the movable object via actuation of the carrier or (2) the movable object relative to the target, in response to said determination.

The payload may be an image capturing device and the target may be a field of view imaged by the image capturing device. The non-transitory computer readable medium may include program instructions for controlling the size of the field of view without regard to the attitude of the terminal. The non-transitory computer readable medium may also comprise program instructions for controlling the size of the field of view via a touch interaction with a user interface displayed on the terminal.

In some embodiments, the payload is rotated relative to the target about one or more of the following axes: pitch, roll, or yaw axes. The non-transitory computer readable medium may include program instructions for effecting rotation of the movable object relative to a target about one or more axes of rotation. The one or more axes of rotation may be selected from one or more of the following: pitch, roll, yaw axes. The non-transitory computer readable medium may further include program instructions for effecting movement of the movable object relative to the target via actuation of one or more motors of the movable object. The actuation of the one or more motors of the movable object can cause movement of one or more rotatable blades that provide lift to the movable object.

The movable object may be an unmanned aerial vehicle.

In some implementations, the determination is made said processor at said carrier. In other implementations the determination is made by said processor at said terminal. Alternatively, said determination can be made by said processor at an external device in communication with the terminal and the carrier.

A system for controlling positioning of a payload may be provided in accordance with additional aspects of the invention. The system may comprise: a carrier on a movable object, said carrier supporting the payload, wherein the payload is rotatable relative to the movable object via the carrier about one or more axes of rotation, and the movable object is movable relative to a target; a receiver configured to receive a signal from a terminal that is remote relative to the movable object, the carrier and the payload, said signal indicative of an attitude of the terminal; a processor that determines in response to the signal (1) whether to rotate the payload relative to the movable object, and (2) whether to move the movable object relative to the target; and one or more actuators in communication with the processor and configured to actuate at least one of (1) the payload relative to the movable object via actuation of the carrier or (2) the movable object relative to the target, in response to said determination.

The payload may be an image capturing device and the target may be a field of view imaged by the image capturing device. In some embodiments, the size of the field of view is controlled without regard to the attitude of the terminal. The size of the field of view may be controlled via a touch interaction with a user interface displayed on the terminal.

The payload can be moved relative to the target about one or more axes of rotation. The one or more actuators may be one or more motors that cause at least one portion of the carrier to rotate about an axis of rotation. The axis of rotation may be a pitch, roll, or yaw axis. The movable object may be rotatable relative to a target about one or more axes of rotation. The one or more axes of rotation can be selected from one or more of the following: pitch, roll, yaw axes. The movable object may be movable relative to the target via actuation of one or more motors of the movable object. The actuation of the one or more motors of the movable object can cause movement of one or more rotatable blades that provide lift to the movable object.

In some embodiments, the movable object is an unmanned aerial vehicle.

Optionally, said processor is at said carrier. In another example, said processor is at said terminal. Otherwise, said processor can be at an external device in communication with the terminal and the carrier.

Additionally, aspects of the invention may be directed to a method of controlling an image capturing device, said method comprising: providing the image capturing device supported by a carrier on a movable object, wherein the image capturing device is movable relative to the movable object via the carrier, and the movable object is movable relative to a target; receiving, at a receiver positioned on the carrier or the movable object, from a terminal that is remote relative to the movable object, the carrier and the image capturing device, a signal indicative of a touch interaction between a user and a user interface of the terminal; determining, with aid of a processor and in response to the signal (1) whether to move the image capturing device relative to the movable object or whether to adjust the focal length of the image capturing device, and (2) whether to move the movable object relative to the target; and effecting at least one of (1) movement of the payload relative to the movable object via actuation of the carrier, (2) adjustment of the focal length of the image capturing device, or (3) movement of the movable object relative to the target, in response to said determination.

The target may be a field of view imaged by the image capturing device. The size of the field of view may be controlled based on said signal. The signal may be indicative of a finger pinch or spread on the user interface. The method may include controlling the placement of the field of view based on said signal. The signal may be indicative of a finger swipe across the user interface.

The method may further comprise displaying, on the user interface, the field of view imaged by the image capturing device. The method may also include generating said signal indicative of the touch interaction by altering the image displayed on the user interface via finger pinch, spread, or swipe.

The image capturing device can be moved relative to the movable object about one or more axes of rotation. The image capturing device may be moved with aid of a motor of the carrier. The movable object may be rotated relative to a target about one or more axes of rotation. The movable object can be moved relative to the target via actuation of one or more motors of the movable object. The actuation of the one or more motors of the movable object can cause movement of one or more rotatable blades that provide loft to the movable object.

The movable object may be an unmanned aerial vehicle.

In some embodiments, the determination is made said processor at said carrier. In other embodiments, said determination is made by said processor at said terminal. Said determination can alternatively be made by said processor at an external device in communication with the terminal and the carrier.

Aspects of the invention may also include a non-transitory computer readable medium containing program instructions for controlling an image capturing device supported by a carrier on a movable object, wherein the image capturing device is movable relative to the movable object via the carrier, and the movable object is movable relative to a target, said computer readable medium comprising: program instructions for analyzing a signal indicative of a touch interaction between a user and a user interface of a terminal, said signal received by a receiver positioned on the carrier or the movable object, from the terminal that is remote relative to the movable object, the carrier and the image capturing device; program instructions for determining, with aid of a processor and in response to the analyzed signal (1) whether to move the image capturing device relative to the movable object or whether to adjust the focal length of the image capturing device, and (2) whether to move the movable object relative to the target; and program instructions for effecting at least one of (1) movement of the payload relative to the movable object via actuation of the carrier, (2) adjustment of the focal length of the image capturing device, or (3) movement of the movable object relative to the target, in response to said determination.

The target may be a field of view imaged by the image capturing device. The non-transitory computer readable medium may include program instructions for controlling the size of the field of view based on said signal. The signal can be indicative of a finger pinch or spread on the user interface. The non-transitory computer readable medium may further comprise program instructions for controlling the placement of the field of view based on said signal. The signal may be indicative of a finger swipe across the user interface.

The non-transitory computer readable medium may include program instructions for displaying, on the user interface, the field of view imaged by the image capturing device. Program instructions may also be provided for generating said signal indicative of the touch interaction by altering the image displayed on the user interface via finger pinch, spread, or swipe.

The image capturing device can be moved relative to the movable object about one or more axes of rotation. The movable object may be rotated relative to a target about one or more axes of rotation. The non-transitory computer readable medium may include program instructions for effecting actuation of one or more motors of the movable object to cause movement of one or more rotatable blades that provide lift to the movable object.

The movable object may be an unmanned aerial vehicle.

Optionally, said determination is made said processor at said carrier. In other instances, said determination is made by said processor at said terminal. Alternatively, said determination is made by said processor at an external device in communication with the terminal and the carrier.

A system for controlling an image capturing device may be provided in accordance with other aspects of the invention, said system comprising: a carrier on a movable object, said carrier supporting the image capturing device, wherein the image capturing device is movable relative to the movable object via the carrier, and the movable object is movable relative to a target; a receiver configured to receive a signal from a terminal that is remote relative to the movable object, the carrier and the image capturing device, said signal indicative of a touch interaction between a user and a user interface of the terminal; a processor that determines in response to the signal (1) whether to move the image capturing device relative to the movable object or whether to adjust the focal length of the image capturing device, and (2) whether to move the movable object relative to the target; and one or more actuators in communication with the processor and configured to effect at least one of (1) movement of the image capturing device relative to the movable object via actuation of the carrier, (2) adjustment of the focal length of the image capturing device, or (3) movement of the movable object relative to the target, in response to said determination.

The target may be a field of view imaged by the image capturing device. The size of the field of view can be controlled based on said signal. The signal may be indicative of a finger pinch or spread on the user interface. The placement of the field of view can be controlled based on said signal. The signal may be indicative of a finger swipe across the user interface.

The user interface may display the field of view imaged by the image capturing device. The signal indicative of the touch interaction can be generated by altering the image displayed on the user interface via finger pinch, spread, or swipe.

The image capturing device can be moved relative to the movable object about one or more axes of rotation. The movable object may be moved relative to the target about one or more axes of rotation. In some embodiments, the actuator is a motor that causes at least one portion of the carrier to rotate about an axis of rotation. The movable object may be rotatable relative to a target about one or more axes of rotation. The movable object may be moved relative to the target via actuation of one or more motors of the movable object. The actuation of the one or more motors of the movable object can cause movement of one or more rotatable blades that provide loft to the movable object.

In some implementations, the movable object is an unmanned aerial vehicle.

The processor may be provided at said carrier. In other instances, the processor is at said terminal. Alternatively the processor is at an external device in communication with the terminal and the carrier.

Aspects of the invention may also include a method of controlling positioning of a payload, said method comprising: providing a payload supported by a carrier on a vehicle or a living subject, wherein the payload is movable about one or more axes of rotation; receiving, at a receiver positioned on the carrier or the vehicle, from a terminal that is configured to be worn by a user, said terminal having an extension to secure the terminal to a portion of the user's body, and said terminal being remote relative to the vehicle or the living subject, the carrier and the payload, a signal indicative of an attitude of the terminal; and moving the payload about the one or more axes of rotation in response to the signal.

The terminal can be configured to be worn on the user's head and the extension secures the terminal to the user's head. The terminal may be a helmet. The terminal can be supported by the user's nose and/or ears. The terminal may be formed of gloves.

The payload may be an image capturing device.

In some embodiments, the vehicle is an unmanned aerial vehicle.

The living subject may be a mammal. The living subject can be a human. In some instances, the living subject is an animal. The living subject may be substantially mobile.

In some embodiments, moving the payload includes moving the payload relative to the vehicle or the living subject via actuation of the carrier. Moving the payload may include moving the vehicle about one or more axes of rotation.

In accordance with aspects of the invention a non-transitory computer readable medium containing program instructions for controlling positioning of a payload supported by a carrier on a vehicle or a living subject, wherein the payload is movable about one or more axes of rotation may be provided. The computer readable medium may comprise: program instructions for analyzing a signal indicative of an attitude of a terminal, said signal received by a receiver positioned on the carrier or the vehicle, from the terminal that is configured to be worn by a user, said terminal having an extension to secure the terminal to a portion of the user's body, and said terminal being remote relative to the vehicle or the living subject, the carrier and the payload; and program instructions for effecting movement the payload about the one or more axes of rotation in response to the analyzed signal.

The terminal may be configured to be worn on the user's head and the extension may secure the terminal to the user's head. The terminal may be a helmet. The terminal can be supported by the user's nose and/or ears. The terminal may be formed of gloves.

The payload may be an image capturing device.

The vehicle may be an unmanned aerial vehicle.

The living subject may be a mammal. The living subject can be a human. In some instances, the living subject is an animal. The living subject may be substantially mobile.

In some embodiments, the program instructions for effecting movement of the payload includes program instructions for effecting movement of the payload relative to the vehicle or the living subject via actuation of the carrier. The program instructions for effecting movement of the payload may include program instructions for effecting movement of the vehicle about one or more axes of rotation.

Moreover, aspects of the invention may include a system for controlling positioning of a payload, said system comprising: a carrier on a vehicle or a living subject, said carrier supporting the payload, wherein the payload is movable about one or more axes of rotation; a receiver configured to receive a signal from a terminal that is configured to be worn by a user, said terminal having an extension to secure the terminal to a portion of the user's body, and said terminal being remote relative to the vehicle or the living subject, the carrier and the payload, said signal indicative of an attitude of the terminal; and one or more actuators in communication with the receiver and configured to move the payload about the one or more axes of rotation in response to the signal.

The terminal can be configured to be worn on the user's head and the extension secures the terminal to the user's head. The terminal may be a helmet. The terminal can be supported by the user's nose and/or ears. The terminal may be formed of gloves.

The payload may be an image capturing device.

In some embodiments, the vehicle is an unmanned aerial vehicle.

The living subject may be a mammal. The living subject can be a human. In some instances, the living subject is an animal. The living subject may be substantially mobile.

The one or more actuators may be configured to move the payload relative to the vehicle or living subject. The one or more actuators can be configured to move the vehicle about one or more axes of rotation.

In some aspects, the invention may include a method of controlling positioning of a payload, said method comprising: providing a payload supported by a carrier on a vehicle or living subject, wherein the payload is movable about one or more axes of rotation; receiving, at a receiver positioned on the carrier or the vehicle, from an image capture device of a terminal that is remote relative to the movable object, the carrier and the payload, a signal indicative of an image captured by the image capture device; and moving the payload about the one or more axes of rotation in response to the signal.

The payload may be another image capturing device.

In some embodiments, the vehicle is an unmanned aerial vehicle.

The image capture device may be integrated into the terminal. Alternatively, the image capture device may be physically separate from the terminal and is in communication with the terminal.

In some embodiments, the signal is indicative of eye movements by a user of the terminal. In other implementations, the signal is indicative of a gesture by a user of the terminal. The signal may be indicative of a facial expression of a user of the terminal.

Moving the payload may include moving the payload relative to the vehicle or living subject via actuation of the carrier. Moving the payload can include moving the vehicle about one or more axes of rotation.

The method includes receiving, at the receiver, a signal indicative of an audio signal captured by an audio sensor.

Additional aspects of the invention may be directed to a non-transitory computer readable medium containing program instructions for controlling positioning of a payload supported by a carrier on a vehicle or living subject, wherein the payload is movable about one or more axes of rotation, said computer readable medium comprising: program instructions for analyzing a signal indicative of an image captured by an image capture device of a terminal, said signal received by a receiver positioned on the carrier or the vehicle, from the image capture device of the terminal that is remote relative to the movable object, the carrier and the payload; and program instructions for effecting movement of the payload about the one or more axes of rotation in response to the analyzed signal.

The payload may be another image capturing device.

In some embodiments, the vehicle is an unmanned aerial vehicle.

The image capture device may be integrated into the terminal. Alternatively, the image capture device may be physically separate from the terminal and is in communication with the terminal.

In some embodiments, the signal is indicative of eye movements by a user of the terminal. In other implementations, the signal is indicative of a gesture by a user of the terminal. The signal may be indicative of a facial expression of a user of the terminal.

Program instructions for effecting movement of the payload may include program instructions for moving the payload relative to the vehicle or living subject via actuation of the carrier. Program instructions for effecting movement of the payload can include program instructions for moving the vehicle about one or more axes of rotation.

The non-transitory computer readable medium may include program instructions for analyzing a signal indicative of an audio signal captured by an audio sensor, said signal received by the receiver.

In accordance with aspects of the invention, a system may be provided for controlling positioning of a payload, said system comprising: a carrier on a vehicle or living subject, said carrier supporting the payload, wherein the payload is movable about one or more axes of rotation; a receiver configured to receive a signal from a terminal that is remote relative to the movable object, the carrier and the payload, said signal indicative of an image captured by an image capture device of the terminal; and one or more actuators in communication with the receiver and configured to move the payload about the one or more axes of rotation in response to the signal.

The payload may be another image capturing device.

In some embodiments, the vehicle is an unmanned aerial vehicle.

The image capture device may be integrated into the terminal. Alternatively, the image capture device may be physically separate from the terminal and is in communication with the terminal.

In some embodiments, the signal is indicative of eye movements by a user of the terminal. In other implementations, the signal is indicative of a gesture by a user of the terminal. The signal may be indicative of a facial expression of a user of the terminal.

The one or more actuators may be configured to move the payload relative to the vehicle or living subject. The one or more actuators may be configured to move the vehicle about one or more axes of rotation. The receiver may be configured to receive a signal indicative of an audio signal captured by an audio sensor.

Also, aspects of the invention may provide a method of controlling positioning of a payload supported by a carrier on a movable object, said method comprising: receiving, at a receiver positioned on the carrier or the movable object, a signal from a sensor indicative of an attitude of a terminal, said terminal being remote relative to the payload; determining whether the attitude of the terminal falls within a predetermined angle range; and varying and/or maintaining a rotational attribute of the payload in response to the signal indicative of the attitude of the terminal, wherein the attitude of the terminal controls a first rotational attribute of the payload when the attitude of the terminal falls within the predetermined range, and wherein the attitude of the terminal controls a second rotational attribute of the payload when the attitude of the terminal falls outside the predetermined range.

In some embodiments, the first rotational attribute is a rotational position. The second rotational attribute may be a rotational speed.

The terminal may be a handheld device. The terminal may be configured to be worn on a user's head. The terminal may comprise a display showing a user interface with a range of angles and a visual indicator of the attitude of the terminal within the range of angles. The method may include displaying, on the user interface, a subset of the range of angles in a visually discernible manner as the predetermined range. The range of angles may be displayed as a slider bar and the visual indicator is positioned within the slider bar.

In some instances, the movable object is an unmanned aerial vehicle. The payload may be an image capturing device.

A non-transitory computer readable medium may be provided in accordance with aspects of the invention. The non-transitory computer readable medium may contain program instructions for controlling positioning of a payload supported by a carrier on a movable object, and said computer readable medium may comprise: program instructions for analyzing a signal from a sensor indicative of an attitude of a terminal, said signal received by a receiver positioned on the carrier or the movable object, said terminal being remote relative to the payload; program instructions for determining whether the attitude of the terminal falls within a predetermined angle range; and program instructions for effecting variation and/or maintenance of a rotational attribute of the payload in response to the signal indicative of the attitude of the terminal, wherein the attitude of the terminal controls a first rotational attribute of the payload when the attitude of the terminal falls within the predetermined range, and wherein the attitude of the terminal controls a second rotational attribute of the payload when the attitude of the terminal falls outside the predetermined range.

In some embodiments, the first rotational attribute is a rotational position. The second rotational attribute may be a rotational speed.

The terminal may be a handheld device. The terminal may be configured to be worn on a user's head. The terminal may comprise a display showing a user interface with a range of angles and a visual indicator of the attitude of the terminal within the range of angles. Program instructions may be provided for displaying, on the user interface, a subset of the range of angles in a visually discernible manner as the predetermined range. The range of angles may be displayed as a slider bar and the visual indicator is positioned within the slider bar.

In some instances, the movable object is an unmanned aerial vehicle. The payload may be an image capturing device.

Additional aspects of the invention may include a method of controlling positioning of a payload, said method comprising: displaying, on a user interface of a terminal, at least one visual selector that causes control of the payload position via the terminal to be turned on or off; receiving, at the terminal, a signal from a sensor indicative of the attitude of the terminal; and displaying, on the user interface of the terminal, at least one attitude range indicator having a first region and a second region visually discernible from the first region, said attitude range indicator having a visual indicator of the attitude of the terminal in response to said signal.

The visual selector may be an on-off button that a user selects or de-selects, thereby turning the control of the payload via the terminal on or off respectively.

The payload may be an image capturing device. The payload can be supported by a carrier on a movable object. The movable object may be an unmanned aerial vehicle.

The method may include permitting the user to interact with the user interface via a touchscreen. The method may further include displaying an additional visual selector, wherein the at least one visual selector turns on and off the control of the payload with respect to a pitch rotation, and wherein the additional visual selector turns on and off control of the payload with respect to a roll rotation. The visual indicator of the attitude of the payload may be indicative of the pitch angle of the payload. The method may further include displaying an additional attitude range indicator having a first region and a second region visually discernible from the first region, said attitude range indicator having a visual indicator of the roll angle of the payload in response to said signal.

A non-transitory computer readable medium containing program instructions for controlling positioning of a payload, said computer readable medium comprising: program instructions for displaying, on a user interface of a terminal, at least one visual selector that causes control of the payload position via the terminal to be turned on or off; program instructions for analyzing a signal from a sensor indicative of the attitude of the terminal, said signal received by the terminal; and program instructions for displaying, on the user interface of the terminal, at least one attitude range indicator having a first region and a second region visually discernible from the first region, said attitude range indicator having a visual indicator of the attitude of the terminal in response to said signal.

The visual selector may be an on-off button that a user selects or de-selects, thereby turning the control of the payload via the terminal on or off respectively.

The payload may be an image capturing device. The payload can be supported by a carrier on a movable object. The movable object may be an unmanned aerial vehicle.

The non-transitory computer readable medium may include program instructions for analyzing user interaction with the user interface via a touchscreen. The non-transitory computer readable medium may also include program instructions for displaying an additional visual selector, wherein the at least one visual selector turns on and off the control of the payload with respect to a pitch rotation, and wherein the additional visual selector turns on and off control of the payload with respect to a roll rotation. The visual indicator of the attitude of the payload may be indicative of the pitch angle of the payload. The non-transitory computer readable medium may comprise program instructions for displaying an additional attitude range indicator having a first region and a second region visually discernible from the first region, said attitude range indicator having a visual indicator of the roll angle of the payload in response to said signal.

Aspects of the invention may also be directed to a terminal for controlling positioning of a payload, said terminal comprising: a display showing a user interface of a terminal, said user interface showing at least one visual selector that causes control of the payload position via the terminal to be turned on or off; and a receiver configured to receive a signal from a sensor indicative of the attitude of the terminal, wherein the user interface further displays at least one attitude range indicator having a first region and a second region visually discernible from the first region, said attitude range indicator having a visual indicator of the attitude of the terminal in response to said signal.

The visual selector may be an on-off button that a user selects or de-selects, thereby turning the control of the payload via the terminal on or off respectively. The display may be a touchscreen and wherein the user may interact with the user interface via the touchscreen. The user interface may further show an additional visual selector, wherein the at least one visual selector turns on and off the control of the payload with respect to a pitch rotation, and wherein the additional visual selector turns on and off control of the payload with respect to a roll rotation. The visual indicator of the attitude of the payload may be indicative of the pitch angle of the payload. The user interface may further show an additional attitude range indicator having a first region and a second region visually discernible from the first region, said attitude range indicator having a visual indicator of the roll angle of the payload in response to said signal.

The terminal may have an image capturing device configured to capture an image of the user when the user is interacting with the user interface. The terminal may also have an audio sensor configured to capture audio signals from the user when the user is interacting with the terminal. The terminal may be handheld.

Furthermore, aspects of the invention may include a method of controlling positioning of a payload, said method comprising: providing a payload supported by a carrier on a vehicle or living subject, wherein the payload is movable relative to the vehicle or living subject via the carrier about one or more axes of rotation, and wherein the carrier comprises one or more frame components and one or more actuators; receiving, at a receiver positioned on the carrier or the vehicle, a signal from a terminal that is remote relative to the vehicle or living subject, the carrier and the payload; and moving the payload relative to the vehicle or living subject about the one or more axes of rotation via movement of the one or more frame components driven by the one or more actuators of the carrier in response to the signal.

The one or more frame components may be gimbals. The one or more frame components may be three gimbals connected to one another at orthogonal pivot axes.

In some embodiments, the vehicle is an unmanned aerial vehicle.

The signal from the terminal may be indicative of an attitude of the terminal. The signal from the terminal can be indicative of an input by a user of the terminal.

A non-transitory computer readable medium may be provided in accordance with aspects of the invention, said non-transitory computer readable medium containing program instructions for controlling positioning of a payload supported by a carrier on a vehicle or living subject, wherein the payload is movable relative to the vehicle or living subject via the carrier about one or more axes of rotation, and wherein the carrier comprises one or more frame components and one or more actuators, and said computer readable medium comprising: program instructions for analyzing a signal indicative of an attitude of a terminal, said signal received by a receiver positioned on the carrier or the vehicle, from the terminal that is remote relative to the vehicle or living subject, the carrier and the payload; and program instructions for effecting movement of the payload relative to the vehicle or living subject about the one or more axes of rotation via movement of the one or more frame components driven by the one or more actuators of the carrier in response to the signal.

The one or more frame components may be gimbals. The one or more frame components may be three gimbals connected to one another at orthogonal pivot axes. The vehicle can be an unmanned aerial vehicle.

The signal from the terminal may be indicative of an attitude of the terminal. In some embodiments, the signal from the terminal is indicative of an input by a user of the terminal.

In accordance with aspects of the invention, a carrier for positioning a payload may be provided. The carrier may comprise: one or more frame components configured to be attached to a vehicle or living subject, said one or more frame components further being configured to support a payload, wherein the payload is movable relative to the vehicle or living subject via actuation of the one or more frame components about one or more axes of rotation; a receiver configured to receive a signal from a terminal that is remote relative to the vehicle or living subject, the frame assembly and the payload; and one or more actuators in communication with the receiver, said one or more actuators being configured to actuate the one or more frame components, thereby moving the payload relative to the vehicle or living subject about the one or more axes of rotation in response to the signal.

The one or more frame components may be gimbals. The one or more frame components can be three gimbals connected to one another at orthogonal pivot axes.

In some instances, the vehicle is an unmanned aerial vehicle.

The signal from the terminal may be indicative of an attitude of the terminal. The signal from the terminal can optionally be indicative of an input by a user of the terminal.

One aspect of the present disclosure is a remote-control method, comprising: receiving via a terminal a state signal that corresponds to a user's position; remote-controlling the state of the a load being carried on a movable object based on the state signal; wherein the state of the load is the result of superimposing the movement of the load relative to the movable object and the movement of the object relative to its environment.

In some embodiments, the load comprises a carrier, and controlling the state of the load based on the state signal is controlling the state of the carrier based on state signal.

In some embodiments, the load further comprises a payload, wherein the payload couples with the carrier, wherein controlling the state of the carrier based on the state signal comprises controlling the superimposition of the state of the payload relative to the carrier, the state of the carrier relative to the movable object and the state of the movable object relative to its environment.

In some embodiments, the movable object is an aircraft; the carrier is a cradle head capable of pointing and stabilization; and the payload is a camera.

In some embodiments, the load comprises the payload; controlling the state of the load based on the state signal comprises controlling the superimposition of the state of the payload, wherein the state of the payload is the superimposition of the state of the payload relative to the movable object and the state of the movable object relative to its environment.

In some embodiments, the terminal comprises a built-in or add-on state sensor, configured to generate state signals corresponding to the state of the user.

In some embodiments, the sensor is an inertia measurement unit, an acceleration sensor, an angular velocity sensor, or a magnetometer or an attitude reference system.

In some embodiments, the terminal is a smart phone, tablet computer, or a dedicated video-enabled remote control.

In some embodiments, the state of the terminal comprises relative or absolute pitch, yaw and roll, wherein the state of the terminal corresponds to the relative and absolute pitch, yaw and roll of the article.

In some embodiments, the received signal is a state signal corresponding to the head movement of the user, and the terminal comprises a pair of glasses or a helmet.

In some embodiments, the state signal corresponding to the state of the user is an image signal, a touching signal from a touch-screen of the terminal, or a voice signal; wherein the image signal is a state signal of the user obtained by a camera contained in the terminal, the obtained state signal comprises touch screen signal generated by the sliding of the user's finger on the touch screen, body posture, head posture, direction of the user's eyesight or a combination thereof; wherein the touch screen signal is generated by different hand gestures comprising paddling, circling, and zooming in/out.

In some embodiments, the payload comprises one or more cameras, the state of the payload relative to the carrier comprises the focal length of the one of more cameras, wherein the method further comprises using the state signal to control a superimposition of the distance between the movable object and a target and the focal length of the camera.

In some embodiments, the method further comprises filtering out state signals generated by inadvertent movement of the user and state signals that may generate unsafe movement of the movable object.

Another aspect of the present disclosure is a terminal, comprising: a sensor sensing the state of the user and generating corresponding state signal; a signal processing module converting the state signal to a control signal; a signal transmitting module transmitting the state signal directly or indirectly to the movable object in order to control the position status of the load carried on the movable object based on position status of the user; a human-machine interface to feedback the result generated by the control signal; wherein the state of the load is the superimposition of the article's state of the load relative to the movable object and the state of the movable object relative to its environment.

In some embodiments, the sensor is an inertia measurement unit, an acceleration sensor, an angular velocity sensor, or a magnetometer or an attitude reference system.

In some embodiments, the terminal is a smart phone, tablet computer, or a dedicated video-enabled remote control.

In some embodiments, the state of the terminal comprises relative or absolute pitch, yaw and roll, wherein the state of the terminal corresponds to the relative and absolute pitch, yaw and roll of the article.

In some embodiments, the position status signal corresponding to the user's position status is a state signal corresponding to the head movement of the user, and the terminal comprises a pair of glasses or a helmet.

In some embodiments, the state signal is an image signal, a touching signal from a touch-screen of the terminal, or a voice signal; wherein the image signal is a state signal of the user obtained by a camera contained in the terminal, the obtained state signal comprises touch screen signal generated by the sliding of the user's finger on the touch screen, body posture, head posture, direction of the user's eyesight or a combination thereof; wherein the touch screen signal is generated by different hand gestures comprising paddling, circling, and zooming in/out.

In some embodiments, the payload comprises one or more cameras, the state of the payload relative to the carrier comprises the focal length of the one of more cameras, wherein the method further comprises using the state signal to control a superimposition of the distance between the movable object and a target and the focal length of the camera.

Another aspect of the present disclosure is a remote-control method, comprising: converting a state of a user into a state signal; controlling the state of a load being carried on a movable object via the state signal; wherein the state of the user is the sliding of the user's one or more fingers sliding on a touch screen, state of the user's one or more limbs; state of the user's head, direction of the user's eyesight, the user's voice, or a combination thereof; the user controlling the state of the terminal; wherein the state of the load is at least one of the following: the state of the load relative to the movable object, the state of the movable object relative to its environment, and the superimposition of the state of the load relative to the movable object and the state of the movable object relative to its environment.

In some embodiments, the load comprises a carrier and a payload, the method further comprising: controlling the superimposition of the state of the payload relative to the carrier, the state of carrier relative to the movable object, and the state of the movable object relative to its environment.

In some embodiments, the terminal is a smart phone or a tablet computer, the movable object is an aircraft, the payload comprising one or more cameras, the method further comprising: controlling the aircraft or the camera's pitch, roll and yaw based on the pitch, roll and yaw of the smart phone or the tablet computer.

In some embodiments, terminal is a touch screen smart phone or tablet computer, the movable objects is an aircraft, the carrier comprises one or more cameras, the method further comprising: sliding of the user's finger left and right on the touch screen controlling the left and right orientation of camera and/or the aircraft; wherein a feedback image on the touch screen scrolls accordingly.

In some embodiments, the carrier comprises one or more cameras, the state of the payload relative to the carrier comprises the focal length of the camera, the method further comprising: with respect to the state vector includes a camera focal length, the method further comprising: a user's finger slide zoom in/out gesture control signal corresponding to at least one of the following: controlling at least one of the following via the sliding or zooming in/out by the user's finger: the distance between the movable object and a target; the focal length of the camera; a superimposition of the distance between the movable object and a target and the focal length of the camera; receiving the corresponding pulling in and pushing away of a feedback image.

In some embodiments, the method further comprising: controlling the rate of change of the load's state by controlling the rate of change of the terminal's state.

In some embodiments, the movable object is an aircraft, a vehicle, a vessel, a lever, a supporting rod, or a combination thereof, wherein controlling the state of the movable object relative to its environment is achieved through human power, artificial intelligence or mechanical means.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
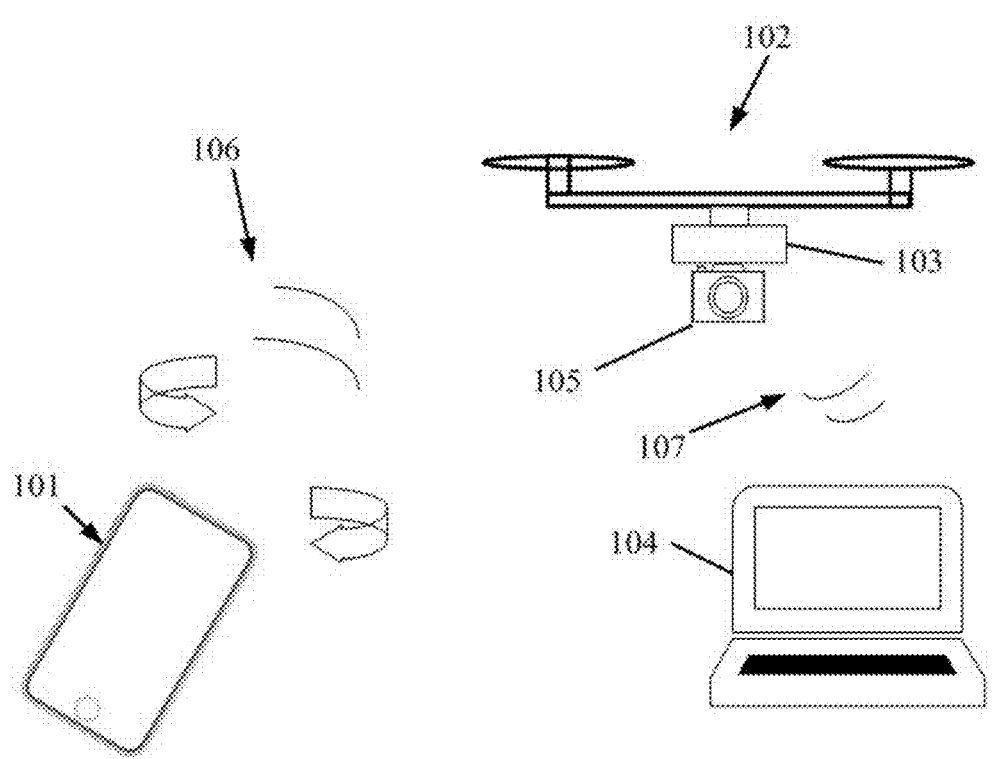
FIG. 1 is a schematic diagram of the remote control method controlling a state of payload.

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for controlling positioning of a payload. Various aspects of the invention described herein may be applied to any of the particular applications set forth below or for any other types of movable object control. The invention may be applied as a standalone device, or as part of an integrated remote communication system. It shall be understood that different aspects of the invention can be appreciated individually, collectively, or in combination with each other.

The disclosed technologies in this application can be applied to movable objects such as air-based movable objects (for example, fixed-wing aircraft such as airplanes or gliders, or rotorcraft such as helicopters, or other aircraft such as blimps or balloons), water-based movable objects (such as submarines, boats, or ships), ground-based movable objects (such as motor vehicles such as cars, motorcycles, buses, trucks, vans; a stick such as a fishing pole or other type of movable support or frame; trains; subways; etc.), or space-based movable objects (e.g. satellites, space stations or spacecraft). A movable object may be capable of moving freely about an environment (e.g., on land, in the water, in the air, in space), or may move along a predetermined path or track or in a constrained manner. The movable object may move about one dimensions, two dimension, or three dimensions. A movable object may be capable of moving automatically in response to a signal, without requiring the movable object to be moved manually. In some instances, the movable object may be a vehicle, such as an aerial vehicle, land-based vehicle, water-based vehicle, space-based vehicle or any combination hereof. A vehicle may be capable of moving freely about one or more designated environments, or may be movable on a track or other fixed path. A vehicle may include a propulsion system. The propulsion system may utilize a motor, engine, electrical components, magnetic mechanisms, gravity, wind, combustion, and/or other propulsion mechanisms. In some instances, a manual propulsion system, human-powered propulsion system, or propulsion system utilizing any other living being may be utilized in a movable object, such as a vehicle. In some instances, the movable object may be a rotorcraft which may be actuated and/or controlled via rotation of one or more blades. The movable object may be actuated and/or repositioned with aid of one or more rotating blades, propellers, wheels, magnets, tracks, or any other mechanisms. In some instances the movable object may be an unmanned vehicle, such as an unmanned aerial vehicle (UAV), which may also be referred to as a drone. The UAV may be capable of hovering, adjusting the UAV's orientation, and/or adjusting the UAV location.

The movable object may be capable of being controlled remotely without requiring an individual to be within or on the vehicle. The movable object may be remotely piloted via a terminal. Alternatively, an individual may be within or on the movable object and assisting in controlling the movable object. The movable object may be configured to carry loads. In some instances, the loads carried by the movable objects may include a payload and/or a carrier that may permit the payload to move relative to the movable object.

The movable objects can also have other embodiments. For example, live beings, such as animals, especially dogs, cats, insects, birds, rodents, equines, pigs, and/or dolphins can be used as a movable object to carry the load disclosed in the present application. Living subjects/beings may be mammals. Living subjects/beings may include humans or animals. In some instances, a human may be a movable object. In some instances, living subjects may be substantially mobile or ambulatory. Living subjects may be capable of walking, crawling, swimming, or flying. Artificial insects made in accordance with bionic principle can also be equipped with the carrier disclosed in the present application to stabilize a carried camera, and controlled by a user or artificial intelligence. The state of these movable objects with respect to the environment can be controlled by human, artificial intelligent or mechanical power. In some instances, a living subject may support a payload. Optionally, the living subject may support a carrier that may support a payload and/or permit a payload to move relative to the living subject. The carrier and/or payload may be worn by the living subject. One or more attachment mechanism may be provided to permit the living subject to wear the carrier and/or the payload.

The movable object can have any suitable size and/or dimensions. In some embodiments, the movable object may be of a size and/or dimensions to have a human occupant within or on the movable object. Alternatively, the movable object may be of size and/or dimensions smaller than that capable of having a human occupant within or on the movable object. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of an aerial vehicle (which may be provided as an example of a movable object) may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, an movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of a movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the aerial vehicle may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

A load can comprise a payload and a carrier (for example, a gimbal platform or a mounting structure capable of stabilizing and/or directing the payload). The carrier can have a payload coupled on it. The carrier may support the payload. For example all, most, or part of the weight of the payload may be carried by the carrier. The carrier may be provided on the movable object. The carrier may be connected to or may directly contact the movable object. The payload may or may not directly contact the movable object. The payload may be indirectly connected to the movable object via the carrier.

In some embodiments, the payload and the carrier may be separate or separable pieces from one another. For example, the payload may be removably attached to the carrier. Alternatively, the payload and the carrier may be affixed to one another and may not be separated from one another. The payload and carrier may be integrally formed. In some embodiments, the payload and carrier may be provided within the same housing. Alternatively, they may be provided in different housings or no housings may be provided. The carrier may permit movement of the payload. The carrier may permit movement of the payload relative to the movable object, regardless of whether the carrier is a separate piece or integrated with the payload. The movement may be a simple movement, such as rotation about one, two, or three axes, or a simple translation in relation to one, two, or three axes. In one example, a load can comprise the payload and carrier within a housing. The carrier may be a portion of the load that may permit movement of the payload relative to the movable object. The payload may be a portion of the load that performs a function (e.g., image capture, illumination output, sound output, remote sensing, delivery of object). The housing may be attached to a movable object. The load may be fixed relative to the movable object, or may be movable relative to the movable object. In one example, the load may rotate relative to the movable object. In some instances, a carrier may permit the rotation of the load relative to the movable object about a rotational axis.

The carrier may have a frame assembly and an actuation assembly. The frame assembly may provide structural support. In some instances, the frame assembly may have one or more individual frame components. The individual frame components may be movable relative to one another. A gimbal platform or other arrangements may be used for the individual frame components, or in the connection between the individual frame components. A carrier may optionally include a set of one, two or three gimbals, mounted on each other with orthogonal pivot axes. An actuation assembly may include one or more actuators (e.g., motors). The actuators may cause the individual frame components to move relative to one another. Movement of one or more frame components may result in movement of the payload relative to the movable object. The frame components may rotate about one or more axes of rotation, thus causing the payload to rotate about one or more axes relative to the movable object. The frame components may be able to rotate relative to one another. The frame components may rotate about one or more pivot axes. For example, movement of one frame component may cause a payload to rotate about a pitch axis, movement of another frame component may cause the payload to rotate about a yaw axis, and movement of another frame component may cause the payload to rotate about the roll axis. The actuators may cause rotation about different axes of rotation. For example, actuation of a first actuator may cause rotation of the payload about a roll axis, actuation of a second actuator may cause rotation of the payload about a pitch axis, and actuation of a third actuator may cause rotation of the payload about a yaw axis. The actuator may cause the movement of the frame components. The actuators may permit multiple frame components to move simultaneously (e.g., permit rotation of the payload about multiple axes simultaneously) or may be configured to permit movement of one frame component at a time (e.g., permit rotation of the payload about one axis of rotation at a time). The carrier may permit rotation about, one, two, or three axes which may correspond to any of a roll, pitch, or yaw axis, or combination thereof.

In some embodiments, the state of the payload may be adjustable. The state of the payload can include the location (such as height/altitude, horizontal/lateral position, etc.), posture/attitude (such as pitch, roll, yaw angles, etc.), movements (such as translational or rotational movement), acceleration (such as linear or angular acceleration), and the like or any combination thereof. In some instances, the state of the payload may include the positioning of the payload which can include the location and/or orientation/attitude of the payload. For example, controlling the positioning of the payload or other object may include controlling the distance, height/altitude, horizontal/lateral position, coordinates, angle relative to pitch axis, angle relative to roll axis, and/or angle relative to yaw axis of a payload or other object. In some embodiments, the state of the payload can include operational parameters of the payload such as on or off status, focal length and/or shutter speed of a camera, and the like. In some embodiments, the payload can be maintained at a certain state (e.g., a certain vertical and/or horizontal position, inclination and/or orientation, velocity, acceleration, etc.) by controlling the state of the carrier. For example, the carrier may be controlled to move or rotate along one, two or three rotational axes such that the payload carried by the carrier is maintains its relative position and/or posture regardless of the movement of the movable object to which the carrier is coupled. In some instances, the state of the payload can be varied by controlling the state of the carrier and/or the movable object. For example, the attitude/orientation of the payload may remain the same or be varied by moving the carrier without moving the movable object, by moving the movable object without moving the carrier, or moving a combination of the carrier and the movable object. The position/orientation of the payload with respect to a fixed reference frame (e.g., background environment, or a target of the payload) may be the position/orientation of the payload with respect to the movable object (via the carrier) plus the position/orientation of the movable object with respect to the fixed reference frame. The position/orientation of the payload with respect to the fixed reference frame may be adjusted based on one or more of: adjustment of the position of the payload with respect to the movable object (via the carrier) and/or adjustment of the position/orientation of the movable object with respect to the fixed reference frame.

In some embodiments, a carrier can be an ancillary devise for videography, photography, surveillance, sampling and the like. The payload supported by the carrier may include a camera, camcorder, infrared imaging device, sensor, illumination device, microphone, and the like. The payload may be capable of capturing an image. The image may be a static image (e.g., snapshot) and/or dynamic image (e.g., video). The field of view or object being imaged may be a target of the payload. Optionally, the payload may include one or more of the following: photosensor, optical element (e.g., lens, mirror, filter), energy storage unit (e.g., battery), memory storage unit, or communication unit. Optionally, one or more of the payload elements described may be enclosed within a housing. The embodiments discussed herein use cameras as examples of the payloads that are coupled via carriers to aircrafts. In various embodiments, the payloads can include surveillance monitors, illumination devices, microphones, speakers, and other types of devices.

An object typically has six degrees of freedom, including linear movement along three directions of the three dimensions (X, Y, and Z) and rotation around three axes: pitch, roll and yaw. A remote control device or terminal may be used to control a movable object (such as an aerial vehicle) in the six degrees of freedom, including rotation of the movable object around one or more of the three axes, as well as the rotation of the carrier (of an aerial vehicle) around one or more of the three axes. The remote control device or terminal may also be used to control the speed of rotation and/or translation, or acceleration of the rotation and/or translation. Optionally, the remote control device may control the ultimate position/movement of the payload. One or more processors may be used to determine the movements of the carrier and/or movable object needed in order to put the payload in the desired position and/or provide the desired movement. The processor may be provided in the remote control device/terminal, on a separate external device, or may be part of the movable object, carrier, and/or payload.

The carrier (such as a gimbal platform on an aircraft) may be configured to rotate along three, two, or one axis relative to the moveable object to which the carrier is coupled, such as an aircraft. That is, the carrier may have one, two or three rotational degrees of freedom to move relative to the movable object. Such rotational degrees of freedom may be provided by frame components of the carrier which may move independently of one another. Such carriers (such as a gimbal platform on an aircraft) may be configured provide the functionalities of directing or pointing a payload (e.g., a camera) carried thereon to a particular direction, as well as stabilizing the payload (such as by eliminating or reducing vibration caused by an aircraft). Optionally, the carrier may have one or more translational components. For instance, the carrier may be capable of translational movement relative to the movable object, or may permit a payload to move in a translational manner with respect to the movable object.

In some embodiments, the state of the movable object (e.g., aerial vehicle), the carrier and/or the payload can be controlled separately or in combination via a remote control device or terminal. The terminal may be remote relative to the carrier, payload, and/or movable object. The terminal optionally does not contact the carrier, payload and/or movable object, and/or is movable independently relative to the carrier, payload, and/or movable object. In some embodiments, such control can be applied based on the state of the terminal itself (e.g., inclination, velocity), the state of a user as acquired by the terminal (e.g., gestures, body movement, eye movement, voice), user inputs via a graphical user interface, and the like. The terminal may be hand-held or worn by a user. Alternatively, the terminal may be set on a platform. The terminal may be a smartphone, tablet, laptop, computer, glasses, gloves, helmet, microphone, or any other device. The terminal may include a display which may provide a user interface. A user may be able to view the user interface on the terminal. A user may be able to interact with the terminal via the user interface, voice, gestures, eye movements, or movements of any other part of the user's body (e.g., hand, arm, head, eye, leg, torso).

In some embodiments, the movable object, the carrier and/or the payload may be equipped with one or more sensors such as inertial measurement units and a wireless communication unit configured to communicate with a terminal. Likewise, a terminal may be equipped with sensors such as an inertial measurement unit and a wireless communication unit configured to communicate with the movable object, the carrier and/or the payload. The terminal can also be equipped with input-capturing devices such camera, infrared sensor, motion sensor, accelerometers, microphone, and the like, for capturing visual, audio, gesture, and other state information, commands, or indications of the user.

In some embodiments, sensors such as inertial measurement units may be configured to measure the state of an object (e.g., movable object, carrier, payload, or terminal) that the sensors are attached to. Optionally, the sensors may measure the attitude of the object with respect to three axes of rotation (e.g., pitch angle, roll angle, yaw angle). In some instances, a single sensor may measure the attitude of the object with respect to three axes, while in other embodiments, individual sensors may measure the attitude of the axes with respect to one or two axes. In one instance, one sensor may be provided which may provide the complete attitude/orientation information about the object. Alternatively, the sensors may measure the attitude of the object with respect to one or more axes of rotation. In some instances, multiple attitude sensors may be employed, each relating to a different axis of rotation. The sensors may provide information about a location of an object (e.g., coordinates, height, lateral position). In some instances, global positioning (e.g., GPS) may be used to determine the location of the object. Satellites or reference stations may be used to determine the location of the object. In some instances, the sensors may be configured to provide a measurement of the movement of the object (e.g., speed of rotation or translation). In some instances, multiple sensors may be utilized for different aspects of the state of an object. The state of the object may be relative to another object, or may be relative to the fixed reference frame. For an example of relative states between objects, the attitude of a payload may be relative to the attitude of a movable object. For an example of a relative state between an object and the fixed reference frame, the attitude of the payload may be relative to the Earth.

A wireless communication unit can be configured to transmit signals between the terminal and the movable object, carrier and/or payload. For example, the control signals may be transmitted from the terminal to the carrier or the payload and feedback signals or image data may be transmitted from the carrier and/or payload to the terminal. Optionally, an additional external device may be provided which may communicate with the terminal and/or the movable object, carrier and/or payload. In some instances, one or more additional devices may be provided to display images, calculate and provide instructions, or any other use. Such communications may be wireless. Communications, such as wireless communications may be provided directly between objects (e.g., directly between terminal and movable object, directly between terminal and carrier, directly between terminal and payload), or may occur over a network (e.g., local area network (LAN), wide area network (WAN) such as the Internet, telecommunications network, etc.). In some instances, relay stations, such as towers, satellites, or mobile stations may be used. Wireless communications may or may not be proximity dependent.

The state of a terminal can correspond to the state of the payload with respect to a fixed reference frame. The reference frame may be a background or fixed scene. For instance, the reference frame may be an environment in which the payload is presented. For example, the reference frame may include ground, building surface, geographic features, or any part of the Earth. In one example, the attitude/orientation of a terminal can correspond to the attitude/orientation of the payload. Tilting the terminal by 15 degrees may cause a corresponding 15 degree tilt in the payload. In another example, movement of the terminal may correspond to a movement of the payload. For example laterally moving the terminal may cause lateral motion of the payload. Rotation of the terminal about one or more axes of rotation may cause corresponding rotation of the payload about the one or more axes of rotation. In some instances, a one-to-one correspondence may be provided between the state of the terminal and the state of the payload (e.g., a one degree rotation of the terminal may result in a one degree rotation of the payload). Alternatively, a coefficient or factor may be provided between the state of the terminal and the state of the payload (e.g., a one degree rotation of the terminal may result in a three degree rotation of the payload). In some other implementations, the state of the terminal may correspond to a different state of the payload. For example, tilting the terminal by a certain degree of angle may correspond to a speed of rotation of the payload, rather than directly correlating to the angle of the payload. For examples, relationships between the terminal and payload may include angle-to-angle relationships, angle-to-speed relationships, or angle-to-acceleration relationships. Such relationships may apply to one, two, or three axes of rotation.

Optionally, a terminal may be a handheld device, or may be worn by the user. The corresponding state of the terminal may depend on movement of a hand, head, or other portion of the user. In one example, a tilt of the head of the user may result in a tilt of the terminal worn by the user on the head, which may result in a tilt of the payload. In another example, movement of the user's eye detected by the terminal may result in a corresponding motion of the payload. A movement of the user's hand that is holding a terminal may result in a corresponding movement in the object. A verbal command by a user may be received and/or sensed by the terminal and may result in a corresponding movement in the object.

The maintenance and/or variation of the state of the payload may be implemented by the carrier, the movable object, or any combination thereof. For example, holding a terminal steady may result in maintaining the position and/or orientation of the payload. If the movable object is flying around and adjusting the attitude of the movable object, but it is desired to keep the payload at a steady orientation, the carrier may be actuated to compensate for the motion of the movable object and hold the payload steady. In another example, adjusting an attitude of the terminal over two axes of rotation may result in adjusting the attitude of the payload about the two corresponding axes of rotation. If the carrier is only capable of causing the payload to move about one of those axes relative to the movable object, the movable object may be moved about the other axis of rotation to permit the payload to overall experience rotation about both axes of rotation. In some instances, movement by a movable object may be used to compensate for a lack or limitation of movement of the carrier, or vice versa, to provide a desired state of the payload.

The state of the payload with respect to its fixed reference frame (e.g., background spaces) can depend on the state of the movable object (e.g., aircraft, a submarine, or a motor vehicle). For example, in some cases, the payload (and/or the load including the payload and the carrier) can be completely fixed to the movable object, such that the state of the payload (and/or load) is completely controlled via the control of the movable object by the terminal. This may result in achieving pitch, roll and yaw directional control of the payload carried on the carrier on the movable object by controlling movement of the movable object alone. In other cases, the payload may have three degrees of freedom with respect to the movable object via the carrier. Alternatively, the payload may have one or two degrees of freedom with respect to the movable object via the carrier. The degrees of freedom may reflect rotational degrees of freedom about a roll, pitch, and/or yaw axis. When a payload has one, two, or three degrees of freedom with respect to the movable object via the carrier, the state of the payload is not controlled by the state of the movable object, or may be partially controlled by the state of the movable object.

Operation of the carrier and/or the movable object along the one, two, or three degrees of freedom can be achieved through the state of the terminal (e.g., handheld terminal, worn terminal). Operation of the carrier and/or the movable object may result in a state of the payload. One or more sensors on the terminal may provide a signal about the state of the terminal and/or instructions for operation of the carrier and/or the movable object. One or more sensors on the payload, carrier and/or movable object may provide a signal about the state of the payload, carrier and/or movable object to the terminal. Any of these signals may be useful in generating additional instructions for the operation of the carrier and/or movable object. Feedback may be provided by sensors on multiple objects.

In some embodiments, operation of the carrier and/or the movable object can be achieved via a graphical user interface (GUI) of the terminal. In one example, operation of the carrier and/or movable object can be achieved via a virtual joystick on the terminal. Optionally, the terminal may be a handheld terminal and the virtual joystick may be operated via one or more hand motions or touch selection by a user's hand. In some instances, the graphical user interface may provide feedback information to the user about the state of the payload. The graphical user interface may permit a user to view and/or control the type of payload control in process by the terminal (e.g., angle-to-angle vs. angle-to-speed control).

Optionally, operation of the carrier does not need to rely on the graphical user interface of the terminal, but can achieved via the movement of a user's finger on the screen of the handheld terminal. For example, the movement such as paddling, circling, zooming in/out can control the state of the carrier and the camera's focal length.

In some embodiments, control is achieved via image command obtained by the camera on the terminal. For example, a user's hand can signal to the terminal camera (e.g., a smart phone camera if the terminal is a smart phone) commands such as "stoop", "lift", "tilt left", "right tilt", "turn left", "turn right" as well as circling in the air. Gesture recognition software may be used. Smart phone camera can also acquire commands from the eye movement of the user, thereby receiving and recognizing commanding without requiring contact.

A user may issue voice commands to the terminal. The terminal may control the state of the payload via control of the carrier and/or movable object via voice recognition technology, conversion of audio signal into a command by intelligent terminal processing, and/or wireless transmission of the signal to the carrier and/or movable object.

A terminal may be a wearable object, such as glasses, helmets, wristbands, gloves, arm bands, leg bands, torso bands, or any other device described elsewhere herein. The terminal may include one or more extensions or component to permit the terminal to be worn by the user. The terminal may include one or more straps, encircling portions, bands, ties, velcro, buttons, zippers, snap-fits, or other components that may aid the terminal in being worn by the user. The terminal may be integrated into the user's clothes.

User control may be achieved through a terminal which may be formed as glasses (with embedded monitors) or helmets. Movement or gesturing of the head or the neck can be used to adjust the position/angles of the payload (e.g., via carriers and/or movable object). Adjustment of the position/ orientation of the payload may result in an adjustment of the payload target (e.g., a camera's field of view). Images acquired by a payload that is a camera can be sent back to the glasses or the helmet in real time and/or stored in a data storage unit. Such images may be superimposed over the wearer's field of view. The user may be able to simultaneously control the payload while viewing the images captured by the payload from the payload's point of view. For example, if the carrier (or cradle head of the carrier) is the three-axis type, movement of the head or the neck in each axis corresponds to the movement of the carrier of the in respective axis.

In some embodiments, a state of the payload can be controlled by manual analog cameras. In some instances, gesture recognition may be used. Motion by a user may be captured by a camera of the terminal. Alternatively, motion by a user may be captured by a camera in communication with the terminal. The terminal or an external device may interpret the captured images and create one or more command signals that may be transmitted to the movable object, carrier, and/or payload to effect a desired state of the payload.

In some embodiments, movement of the user's hand can be more accurately captured by specially-made digital gloves in order to control the state of the payloads (i.e., via carrier and/or movable object). For example, in one embodiment, a specially-made digital glove can translate sign language from hearing-impaired people. This kind of system measures the hand gesture in four different elements, including hand shape, hand orientation, hand position and hand movement, all with the position of the human body as a reference.

In some embodiments, control is achieved by the terminal's position relative to the user's face. For example, a user's face's distance from an image capture device of the terminal may be indicative of controlling a payload (e.g., camera) focal length. Moving the terminal laterally relative to the user's face may cause an adjustment of the attitude of the payload.

In some embodiments, facial recognition may be used for control. For example, the expression on a user's face may be indicative of an instruction to change a state of a payload. For example, a frown may mean to adjust the angle of the payload, while a smile may mean to adjust a lateral position of the payload.

Various embodiments are described in detail below with reference to the figures or drawings.

FIG. 1 is a schematic diagram of the remote control method for controlling a position of a payload. In the following example, an aircraft 102 is used as an example of a movable object. However, other types of movable objects may be used, as described elsewhere herein. Any description herein referring to an aircraft may be applied to movable objects and/or any other examples of movable objects. The aircraft may support a load, which may be a combination of a carrier 103 and a payload 105.

In FIG. 1, the handheld terminal 101 may be used to control the aircraft 102 via a control (uplink) signal 106. The terminal 101 can be a smart phone, a tablet computer, a pair of display glasses, a helmet, or any other examples described elsewhere herein. The terminal may have one or more characteristics as described elsewhere herein in various embodiments. The terminal may generate and/or transmit a signal. The signal may be indicative of a state of the terminal or an input from the user. The signal may be generated based on a finger movement by the user, an attitude/orientation of the terminal, movement of the terminal (e.g., rotational and/or translational movement), acceleration of the terminal (e.g., angular and/or linear acceleration), voice command by the user, heat sensed from the user, motion recognition by the terminal from the user, or position or status of a user's body part. In some embodiments, such state signals may differ from the signals generated by the traditional mechanical sticks (i.e. joystick).

Terminal 101 can be equipped with position sensors, such as inertial measurement unit (IMU), acceleration sensors, angular velocity sensors, magnetometers direction or attitude heading reference system (AHRS) system, infrared sensors, audio sensors, touch capacitive sensors, or pressure sensors, and may be configured to obtain data on the state of terminal 101. The state of terminal 101 can correspond to the state of the user's hand or other portion of the user's body. The state of the terminal may be affected by input from the user (e.g., touching a touchscreen of the terminal).

In some embodiments, the aircraft 102 and/or carrier 103 also comprises a state sensor configured to measure the state of aircraft 102 and/or carrier 103. Similarly, the sensor may measure the position (e.g., height/altitude, lateral position), orientation/attitude (e.g., angular position with respect to roll/pitch/yaw axes), movement (e.g., rotational and/or translational), acceleration (e.g., angular or linear), or any other state of the aircraft and/or carrier.

The remote control signal 106 can be a wireless signal, such as radio, infrared, microwave, ultrasonic signal, as well as wired signal. The wireless signal may be via WiFi, cellular, Bluetooth, or WiMAX technologies.

The aircraft 102 can be a multi-rotor helicopter, a regular helicopter or a fixed-wing aircraft. The aircraft may be unmanned. The aircraft may be of a size so that the aircraft may be picked up by a user. Aircraft 102 can be equipped with a carrier 103 and a payload such as camera 105 or lighting device. The payload may be supported on the aircraft via the carrier. Images obtained by the camera can be transmitted to an image display device 104 via feedback (downlink) signal 107, which can be radio, infrared, microwave, ultrasonic, or any other type of signal described elsewhere herein. This may permit the user to observe real-time image from the camera and adjust the orientation of the camera 105 and carrier 103 based on feedback real-time image. Camera 105 can be an ordinary camera or an infrared imager. Camera can be any type of device that may capture images along an electromagnetic spectrum. The image display device 104 may be a separate device than the terminal 101. Alternatively, the image display device 104 may be integrated as part of the device, or images may be displayed on the terminal, serving the same function as the image display device. The image display device may be within a perceptible distance or location relative to the terminal or a user of the terminal. Alternatively, the image display device may be remote relative to the terminal.

A terminal 101 can express a signal corresponding to the state of the terminal and/or a state of the user (such as a hand gesture, movement, etc.). For example, the orientation of the terminal may be expressed by the signal (e.g., angle relative to roll axis, pitch axis, yaw axis). The orientation of the terminal may be reflective of the positioning of a user's hand holding the terminal or another part of the user's body supporting the terminal. The state may be expressed in three axes (pitch, roll and yaw). Optionally, the state may include other information such as position, or any other examples of states described elsewhere herein. A signal indicative of the state can be received by the movable object (e.g., aircraft 102) and/or the carrier 103 and/or the payload (e.g., camera 105). The signal can be used to control of position—status of the payload 105, carrier 103, and/or movable object 102 with respect to the fixed reference frame (i.e. background, a fixed scene). The state of the terminal or the state of the user can remotely control the state of movable object, carrier, and/or payload. Ultimately, the state of the terminal and/or user may be used to control a state of the payload. The state of the payload can comprise the superimposition of the state of the payload with respect to the carrier, the state of the carrier with respect to the movable objects, and/or state of the movable objects with respect to its environment.

In some embodiments, a function of the aircraft is for the carried camera to obtain images of targets. In some examples, the targets may be ground targets, structural targets, moving targets, static targets, or any other type of targets. The distance between the aircraft and the target can be manipulated by the aircraft flying away from or towards the target, thereby achieving a zooming in or zooming out effect on the vision or imaging. Camera lens can also control the zooming in and out. Optionally, the aircraft flying away from or towards the target can be coupled with the focal length of the camera. In other words, a state control command can be implemented by the couple movement of the aircraft flying away or towards the target and the change of the camera's focal length. For example, the aircraft can determine its distance to obstacles, targets, or the ground. When the distance exceeds a preset value or is too short so as to affect flight safety, the corresponding aircraft control commands can be filtered out, so that the aircraft is no longer moving away/closer, so that the control command can only be implemented via camera focal length change. Or, in some specific applications, the user can set the control command to be implemented by camera focal length change in priority or the movement of the aircraft in priority. In some embodiments, a flight control computer can automatically couple or decouple the aircraft's movement toward or away from the target and camera's focal length change, in order to achieve optimized imaging effect.

In some embodiments, a processor may determine whether to use the aircraft movement toward or away from the target alone, camera focal length change, or a combination of the both in zooming in and out. The processor may make such determination in an automated fashion without requiring user intervention. In some instances, the processor may make such determination in accordance with non-transitory computer readable media stored in memory. The processor may make such determination in accordance with one or more algorithms or set of rules. Alternatively, a user may determine the actions or combination of actions to occur for zooming in and out. For example, a user may determine to use aircraft movement alone, camera focal length alone, or a combination of both. The user may determine the conditions and preferences for which actions to use.

In one example, a state of payload 105 with respect to the carrier can be the focal length of the camera. Accordingly, the camera's view can zoom in and out, corresponding to the change of the camera's digital/optical zoom. This movement can be understood as a camera virtually moving on an optical axis. This virtual moving can be achieved via actual physical movement of the camera's lenses, change in lens shape or focal length, or electronic zooming in/out. This virtual movement can be coupled or combined with physical movement of aircraft 102 with respect to its fixed reference frame (i.e., background).

A payload discussed above is not limited to an image-forming device. It can also comprise lighting and other devices. In the virtual wherein the payload is a lighting device, the zooming in and out discussed above corresponds to the size change of a lighted spot or the intensity change of the light.

A state of the carrier 103 relative to the background space can be the coupling or superimposition of the state of the carrier with respect to aircraft 102 and the state of aircraft 102 with respect to its environment. In some instances, the state of 105 payload may be a superimposition of the state of the carrier with respect to the aircraft and the state of the aircraft with respect to its environment. Optionally, the state of the payload may also include the superimposition of the state of the payload with respect to the carrier.

In some embodiments, a processor may determine whether to use the aircraft attitude and/or location relative to a target alone, payload attitude and/or location relative to the movable object (via the carrier), or a combination of the both in adjusting the attitude of the payload and/or location. The processor may make such determination in an automated fashion without requiring user intervention. In some instances, the processor may make such determination in accordance with non-transitory computer readable media stored in memory. The processor may make such determination in accordance with one or more algorithms or set of rules. Alternatively, a user may determine the actions or combination of actions to occur for adjusting or maintaining the payload attitude and/or location. For example, a user may determine to use aircraft movement alone, carrier movement alone, or a combination of both. The user may determine the conditions and preferences for which actions to use.

In some instances, the processor may make the calculation for adjusting the state of a payload based on a signal from a sensor associated with the terminal. For example, the processor may use a signal based on the attitude of the terminal to adjust the attitude of the payload with respect to a fixed reference frame, or with respect to another object. For example, a numerical value indicative of the degree of tilt or orientation may be provided for a signal based on the attitude of the terminal. In some instances, direction of tilt or orientation may be provided for the signal based on the attitude of the terminal. Optionally, the processor may make the calculation for adjusting the state of the payload based on a signal from one or more sensors associated with the movable object, carrier, and/or payload. For example, the payload may have a sensor that provides a signal based on the attitude of the signal. The carrier may have a sensor that provides a signal based on relative position or angles of the carrier frame components. The movable object may have a sensor that provides a position of the movable object relative to a fixed reference frame. Any signal from any one of these objects or multiple objects may be used in formulating a command signal with aid of the processor. These signals may provide feedback on the state of the objects. The feedback signals may optionally be combined with the terminal signal in generating the command signal. The command signal may be generated in real time. The command signal may be used to control the state of the payload with respect to the fixed reference frame. The command signal may be sent to the movable object, carrier, and/or payload to control them. This may result in a control of the state of the payload.

In some instances, the processor may be implemented on the terminal. Alternatively, the processor may be provided on an external device, multiple external devices, cloud computing infrastructure, movable object, carrier, or payload. The processor may be provided on any combination of these locations.

In some extreme examples the payload 105 can be completely fixed to the 102 aircraft, such that the state of the payload is completely controlled via the control of the aircrafts by handheld terminal 101, so as to achieve pitch, roll and yaw directional control of the payload (e.g., camera 105). In such situations a camera 105 can be directly fixed on the aircraft either without a carrier 103, or with a carrier 103 wherein the carrier does not have any degree of freedom to move along any of the three axes.

In other extreme examples, the payload 105 may be movable with respect to the aircraft 102. The payload may be movable about one, two, or three axes. The carrier 103 may have one, two, or three degrees of freedom with respect to aircraft 102. A carrier with three degrees of freedom may be called a three-axis carrier (or cradle head). In other examples, the carrier 103 may be fixed to aircraft 102 on one or two axis. With respect to aircraft 102, in such scenarios the carrier 103 does not have degree of freedom on these fixed axes. Instead, the carrier 103 only has degrees of freedom along the non-fixed axis or axes. Carriers with one and two degree of freedom are called one-axis carrier (or cradle head) or two-axis carrier (or cradle head), respectively. In such scenarios, the payload may be movable with respect to the aircraft about only one or two axes, respectively.

In some embodiments, a payload itself can fulfill the direction-control and stabilization function of a carrier. As such, a payload can be directly fixed on a movable objects (e.g., an aircraft), and without going through connecting or coupling with the intermediate layer of a carrier. Manipulation of the state of the payload can be achieved by controlling the absolute state of the payload (e.g., its state with respect to the environment, such as the fixed reference frame). This may be done by manipulating the state of the movable object with respect to the fixed reference frame. In some instances, this may also be achieved by controlling the superimposition of the state of the payload with respect to the movable object, and the state of the movable object with respect to its fixed reference frame. This may be done by actuating one or more actuators of a carrier, and/or one or more propulsion components of the movable object, respectively. In one example, an actuator of a carrier may effect movement of one or more portion of the carrier and/or the payload, thus permitting the payload to move relative to the movable object. In one example, an actuator of the movable object may cause the movable object to remain in a fixed location or move relative to the target. For example, the actuator may cause a motor of the movable object to vary or maintain its operation, thus affecting the positioning of the movable object (e.g., increasing the speed of a rotor may cause a blade attached to the rotor to spin faster and provide increased lift). Such movement may include translational movement and/or rotational movement.

The terminal 101 can be a smart phone, a tablet computer, a video-enabled dedicated remote control, or any of the other examples described elsewhere herein. Screens on the terminals can serve as image-display device, thus not requiring a separate image-display device 104. Accordingly, feedback (downlink) signal 107 from the camera can be transmitted back to terminal 101.

A terminal may capture input signals and convert the signals into control commands, which can be transmitted with or without encryption. Transmission can be achieved via a wireless local area network (i.e., Wi-Fi), Bluetooth, ultrasonic, infrared, or any other networks or wireless communications described elsewhere herein. The movable object, the carrier, and/or the payload can jointly execute the transmitted command. Using Wi-Fi as an example, Wi-Fi of the movable object and/or the carrier is equivalent to a Wi-Fi access point. A terminal can attempt direct connection to the access point or indirect connection via a repeater. Once the connection is successful, a Wi-Fi network is formed. In some embodiments, the above operation can be carried out as follows.

An example of communications for controlling positioning of a payload is provided. First, a terminal can send a command A to a movable object and/or a carrier. The movable object and/or the carrier can be actuated in response to the command A. The payload may send video signal back to a moving device or terminal. Once proper communication and operation start among the terminal, the movable object, the carrier, and/or the payload, the process of authentication, authorization and login can begin.

The control signal can be transmitted directly or indirectly. For example, in some embodiments, a terminal (e.g., smart phone or tablet computer) can directly transmit a signal to a movable object (e.g., an aircraft) or a carrier via wireless LAN (Wi-Fi), Bluetooth, ultrasonic or infrared. In other embodiments, the control signal is transmitted via a relay station or a repeater, thus expanding the range achieved by the direction transmission by a terminal.

The camera may provide a feedback signal for a terminal. When the camera sends the feedback signal, the signal from the camera can be compressed with or without encryption and then transmitted. In some instances the feedback signal may include images captured by the camera. In other examples, the feedback signal may include information from sensors coupled to the camera about the state of the camera. If the signal is analog signal, the analog signal is first converted to a digital signal. Similarly, feedback signals may be provided by a movable object and/or carrier to a terminal. Such feedback signals may be provided directly, or indirectly via a relay station or a repeater.

Before transmitting a signal to the movable object, carrier, or the camera, the terminal may first receive one or more inputs. In some instances the inputs may be reflective of a state of the terminal or user (e.g., angle of inclination), or an input provided by the user. The input may be converted into a command through an algorithm with or without encryption. The command may be further generated at least in part based on feedback signals from the payload, carrier and/or movable object. The feedback signal may be a state of the relevant object (e.g., payload, carrier, and/or movable object). The command may be used to form a signal, and the terminal may send the command signal to the movable object, the carrier, and/or the payload. The respective objects (e.g., movable object, carrier, and/or payload) may execute the command.

In some instances, the command may be formulated at the terminal based on the inputs. Alternatively, the command may be formed at a separate external device based on a signal reflective of the inputs provided by the terminal. In some embodiments, the command may be formed at the movable object, carrier, and/or payload.

In some implementations, the terminal 101 and the image-display device 104 (such as a notebook computer) can communicate via short-range signal, such as Bluetooth, Wi-Fi, and form a closed-loop feedback. In one example, a terminal may provide a signal to an object. The image display device may display information relating to the object. Information about the state of the object may be sensed and sent back to the terminal and/or the image display device. The terminal object may send additional signals to the object based on signals received from the object, thus providing a feedback loop. Any feedback control schemes known in the art may be utilized. Such feedback controls may be useful for payload stabilization and/or orientation control.

Any such communications may occur in real-time or at a rapid rate (e.g., within a few seconds, within a second, within milliseconds). For instance, the state of the terminal may be sensed and command signals may be generated in real-time. The command signal may then be transmitted to the relevant object (e.g., movable object, carrier, and/or payload) in real-time. A state of the relative object may be measured via a sensor and may be transmitted back to the terminal and/or an image-display device in real time. One or more of the steps may occur automatically with aid of a processor.

Figure 2:
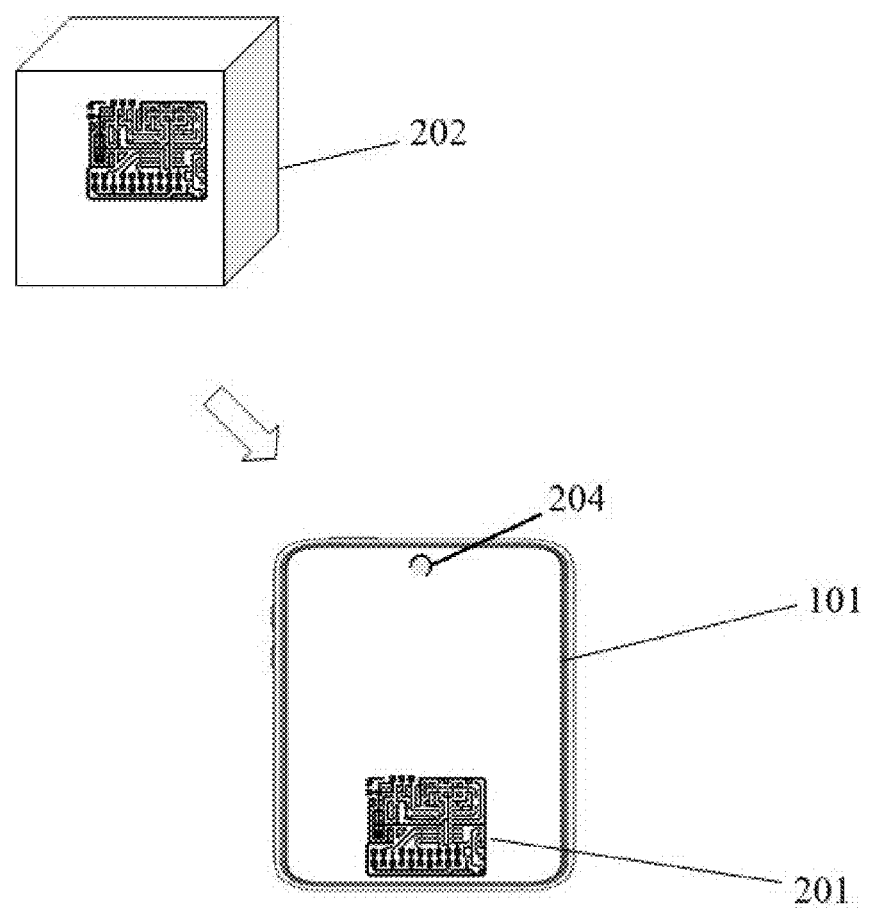
FIG. 2 is a schematic diagram of the sensor sensing the states of various objects.

FIG. 2 illustrates an embodiment using a terminal such as a handheld terminal 101 to control the state of a carrier. Examples of handheld terminal 101 include dedicated terminals, smart phones (e.g., iPhone, Android or Windows-based smart phones), tablet computers (e.g., iPad, etc.), laptops, and so on. Any description herein of a handheld terminal may apply to any other kind of terminal as described elsewhere herein. As shown in FIG. 2, the handheld terminal 101 may have an internal or external sensor 201. In some embodiments, the sensor 201 can be a smart phone's built-in (commercial) sensors, such as acceleration sensors, angular velocity sensors, geomagnetic meters, AHRS systems, or a combination thereof. One example of a commercial sensor is Honeywell's HMC6843.

In other embodiments, the sensor 201 may be an external sensor outside the handheld terminal. The external sensor can be arranged on a dedicated sensing device 202. The sensing device 202 can be bound to the handheld terminal 101. The sensing device 202 may be mechanically bound with the handheld terminal 101, for example by way of pasting/adhesives, bonding, mechanical connections, fasteners, adaptors, or any other technique. For example, the sensing device may be snap-fit to the terminal. In some instances, the sensing device may be removably attached to the terminal (e.g., may be attached or removed repeatedly). Alternatively, the sensing device need not be mechanically connected to the handheld device. The sensing device may be in communication with the handheld terminal wirelessly (such as by way of a radio signal, such as Wi-Fi or Bluetooth). Thus, even if handheld terminal 101 has no built-in inertial sensors, or, its commercial sensor is not suitable for aircraft 102 due to lack of precision and sensitivity, sensing device 202 can be used to control aircraft 102 by following some embodiments of the present disclosure. Any description herein of a sensor of a terminal may also apply to a sensor of a sensing device that is in communication the terminal.

A user or operator can control an attitude of a payload 105 based on the attitude of the terminal 101. For instance, the attitude of the payload may be adjusted by making a corresponding adjustment to the attitude of the terminal. In some instances, the attitude of the payload may be adjusted based on controlling a rotation of one or more components of a carrier, and/or controlling the positioning of the movable object. A user or operator can control the rotation of carrier 103 by adjusting the inclination angle of handheld terminal 101 (or, if sensing device 202 is bound to terminal 101 via non-mechanical means, adjust inclination angle of sensing device 202). The terminal's 101 rotation about at least one axis of the three axes can represent a rotation on a corresponding axis of the carrier 103 and/or payload 105. In some instances, the terminal's rotation about each and every of the three axes can represent a rotation on the corresponding axes of the carrier and/or payload. For instance, in the case of a one-axis carrier 103, the terminal 101 typically controls the pitch axis; in the case of two-axis carrier 103, terminal 101 typically control pitch and roll. Similarly, yaw control of handheld terminal 101 can be used to control yaw movement of carrier 103. In some instances, the adjustment of a terminal with respect to a particular rotational axis may result in the adjustment of the payload attitude with respect to the same axis. Degree and/or direction of rotation of the terminal may be considered in creating a corresponding adjustment of the payload.

In some embodiments, the terminal 101 can be a smart phone or a tablet computer; the movable objects can be an aircraft; the payload can be one or more cameras. As such, a user can adjust terminal's pitch, yaw and roll to control the corresponding pitch, yaw and roll of the aircraft, the carrier and/or the camera. In some embodiments, the pitch, yaw and roll of a smart phone or tablet computer do not necessarily one-to-one correspond with the pitch, yaw and roll of the aircraft, the carrier and/or the camera. In some instances, rotation about a single axis of the terminal may result in rotation about multiple axes of the aircraft, carrier and/or camera depending on the degree of the rotation of the terminal. In some instances, rotation about an axis of the terminal may result in control of the speed of the aircraft, carrier, and/or camera depending on degree of rotation of the terminal.

An additional sensing device 202 need not necessarily be attached to the terminal 101 (e.g., smart phone or tablet), but rather is attached to a dummy camera. The user or operator therefore adjusts the dummy cameras to control the aircraft, the carrier or the payload. As such some users or operators can have the feel of using a real camera when taking images with an aircraft. Optionally, images captured by the camera payload may be transmitted to the dummy camera. The dummy camera may function as an image display device 104.

In some embodiments, an additional sensor device 202 can be attached to a specially-made glove to control the state of the carrier. The special-made (digital) glove can more accurately capture the movement of a user's hands. For example, in one embodiment, the specially-made glove can translate sign language of hearing-impaired people. This kind of system measures the hand gesture. Optionally four different characteristics of hand gestures may be measured including hand shape, hand orientation, hand position and hand movement. Such measurements may be made all with the position of the human body as a reference.

In some embodiments, control can be achieved via the terminal's position with respect to the user's face. The terminal 101 can have a user-facing camera 204 which can detect the state of terminal 101 with respect to a user's face. This state can be converted into a control signal. In some instances, the control signal may be provided without depending on an inertial sensor. In other embodiments, the terminal 101 can use a camera to detect the state of terminal 101 and/or the user with reference to the surrounding environment. This state can also be converted to a control signal, without depending on an inertial sensor to achieve detection. Alternatively, this state information can be combined with inertial sensor information to be converted to a control signal.

The terminal may have one or more different types of sensors that sense various states for the terminal and/or user of the terminal. In some instances, a control signal for a movable object, carrier, and/or payload may be generated based on measurements from the one or more sensors. The control signal may be generated based on an attitude sensor of the terminal. Alternatively, the control signal may be generated based on an image captured by the temrinal. The control signal may be generated based on any combination of signals from any type of sensors, including those mentioned elsewhere herein.

Figure 3:
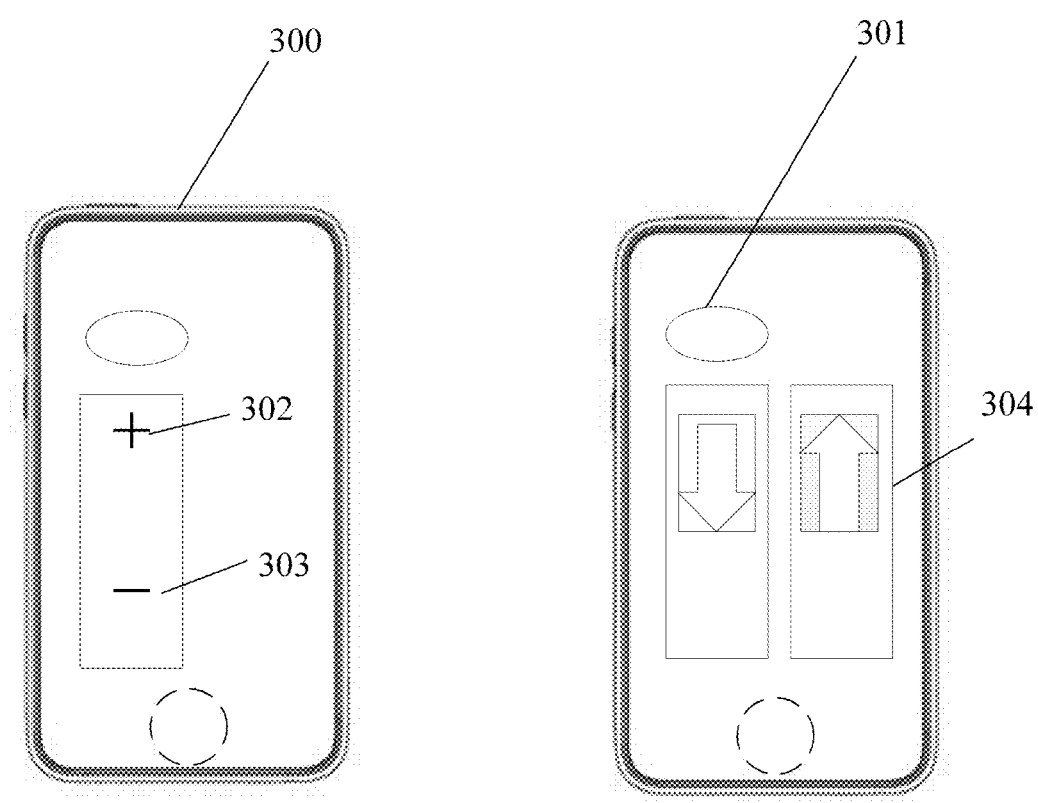
FIG. 3 is a diagram of a software user interface of a single-axis carrier.

FIG. 3 is an example of hardware and a user interface of a terminal that can be adapted to control a one-axis carrier. A handheld terminal 300 may control the pitch axis. Any description herein of a handheld terminal may apply to any other type of terminal. Furthermore, any description herein of a pitch axis may apply to any other axis (e.g., roll axis or yaw axis). A user can click on the screen touch control zone 302 "+" icon and/or 303 "−" icon to control the carrier's up movement or down movement. The above "+" and "−" icon can be replaced by slider 304. The screen may be a touchscreen.

In some examples, the touch control zone may be displayed in a visually intuitive manner. For example, for controlling pitch, the touch control zone may have a corresponding vertical arrangement on the user interface. In another example, for controlling yaw, the touch control zone may have a corresponding horizontal arrangement on the user interface.

In this embodiment, button 301 is a mode selection switch. When a user touches button 301, the controller enters the next mode.

In one example, the mode selection switch may switch between an on and off mode. During the on mode, control by the handheld terminal may result in control of the movable object, carrier, and/or payload. During the off mode, the handheld terminal does not control the movable object, carrier, and/or payload.

Mode selection may occur via a user interaction with a device. For example, the mode selection may occur via a user touching a touch screen, providing a voice command, making a gesture, making an eye movement, moving a portion of the user's body (e.g., location or attitude of the body), moving the terminal (e.g., location or attitude of the terminal). In one example, a user may shake the device to switch modes (e.g., different frequencies or amplitudes of shaking may cause the mode to change). The user may move the device in a pattern to switch modes (e.g., along a predetermined path).

In some instances, mode switching may have a predetermined order and performing the interaction may switch to the next mode in the predetermined order. For example, four modes may be provided (mode 1, mode 2, mode 3, and mode 4). Performing an interaction with the device (e.g., shaking the device) may cause the mode to switch to the next mode (e.g., if the user was on mode 2, the shaking will move it to mode 3, and so forth). In other instances, mode switching may occur so that a mode is selected based on the interaction (i.e. does not necessarily follow a predetermined order). For example, three modes may be provided (mode 1, mode 2, mode 3). A user may provide a verbal cue as to which mode to select (e.g., saying "mode 1" may switch to mode 1, regardless of which mode was previously set).

Different modes can result in different controls. For example, different modes may include a binary on-off setting. In other examples, different modes may refer to selection of axes for control (e.g., isolated single axes—selection to control yaw only, roll only, or pitch only, multi-axes control—selection to control a combination of yaw and roll only, yaw and pitch only, roll and pitch only, or all three axes, actions that result in the control of the single or multiple axes (e.g., rotating a terminal about a roll axis results in rotation of the payload about a roll axis, rotating a terminal about a roll axis results in rotation of the payload about a yaw axis, shaking the terminal at a first frequency may cause the payload to zoom in while shaking the terminal at a second frequency may cause the payload to zoom out), relationships between movements (e.g., angle-to-angle, angle-to-speed, angle-to-acceleration). Modes may correspond to any set of control rules, as to how a state of a terminal or user interaction with a terminal can control an object, such as a movable object, carrier, and/or payload.

In some instances, a user input via the touch control zone may be used to control the movable object, carrier, and/or payload. In other embodiments, an attitude of the terminal may be used to control the movable object, carrier, and/or payload.

Figure 4:
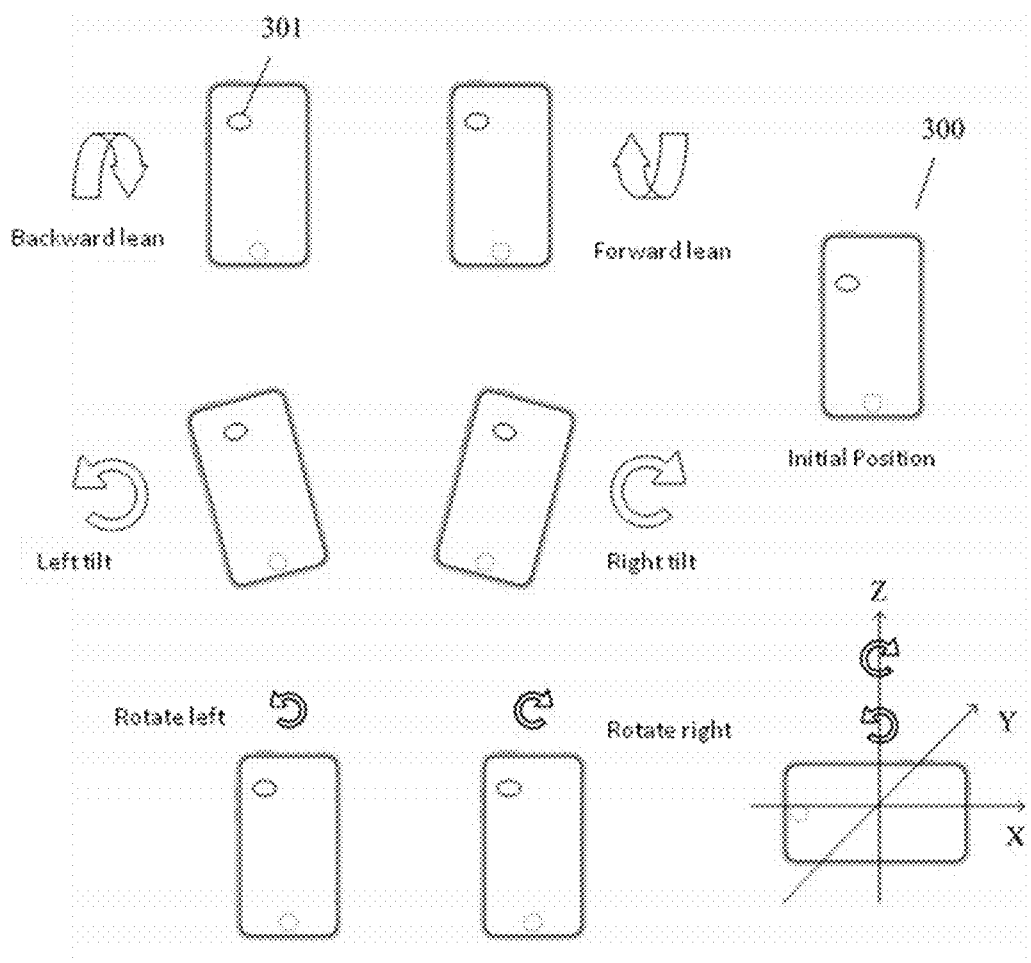
FIG. 4 is a diagram of a software user interface of a two-axis carrier.

FIG. 4 is an example of hardware and a user interface of a terminal that can be adapted to control two-axis carrier. A terminal 300 (e.g., a smart phone) can be held on the end or sideways. One or more visual indicator such as a button 301 can be a mode selection switch. For instance, the mode selection switch may be a virtual button on a touchscreen. When a user touches the mode selection switch 301, the controller enters the next mode. A plurality of modes may be provided. In some instances, two, three, four, five or more modes may be provided. In some embodiments, the modes may be between an on mode and off mode. In other embodiments, the modes may be between the number of controllable axes of rotation provided by a carrier (e.g., one axis, two axes, or three axes modes). In other embodiments, the modes may be between different types of control between the terminal and payload (e.g., angle-to-angle, angle-to-speed, angle-to-acceleration).

Selecting the mode selection switch may cause the controller to move on to the next mode, for example, two-axis carrier mode. In a two-axis carrier mode, the terminal can take on a variety of movements, for example, forward, backward, left-rolling, right-rolling, left-turning, right-turning, up, down, which correspond to the movements of the payload (e.g., camera) and/or the movable object (e.g., aircraft). For example, the payload may look down or look up; the movable object may roll left or right. The movable object may also rotate left or right, as well as ascend and descend.

In some embodiments, when terminal 300 is leaned backwards at an angle over $\Phi 1$ degrees, the camera starts to look down. When terminal 300 is leaned forward at an angle over $\Phi 1$ degrees, the camera starts to look up. The forward or backwards leaning of the terminal may be about a pitch axis. This may cause a corresponding movement about a pitch axis of the payload. When the button 301 is pressed to an off mode, the payload stops moving along the pitch axis. The button may be pressed again to return to an on mode or different control mode.

The terminal may be tilted to the right or to the left. The tilt of the terminal may be about the roll axis of the terminal. This may cause a corresponding movement about the roll axis of the payload. This may occur regardless of magnitude of tile angle. In some other embodiments, when the terminal tilts to the right or left less than a $\Phi 2$ degree tilt angle, the payload tilts about the roll axis correspondingly. When the terminal rolls or tilts to the right or left over the $\Phi 2$ degree tilt angle, the payload may rotate about a different axis, such as the yaw axis. When the terminal rolls or turns over a $\Phi 2$ degree tilt angle, the aircraft's yaw axis control may take over and then the payload may pan to the left or right direction. When the button 301 is pressed to an off mode, the payload stops moving along the roll or yaw axis. The button may be pressed again to return to an on mode or different control mode. In some instances, multiple buttons may be provided and may independently control modes about each axis. Alternatively, a single button may combine modes for the different axes.

Controlling the roll and yaw axis via tilt of the terminal may advantageously permit the user to control the positioning of the payload without having to turn away from the payload. For example, if the payload is mounted onto a movable object, the user may wish to re-orient the payload (e.g., camera) about a yaw axis. However, if this required turning of the terminal about the yaw axis to cause a corresponding rotation of the payload about the yaw axis, the user may have to face away from the payload and/or movable object, or turn the terminal the user is not viewing a screen of the terminal. Thus, a user may control the roll and yaw axis of the payload by tilting the terminal while facing the movable object. However, in alternative embodiments, the rotation of the terminal about the yaw axis may cause rotation of the payload about the yaw axis. In some instances, a user may be able to toggle between different modes (e.g., one mode where control of the yaw axis of the payload occurs via movement of the terminal about the yaw axis, another mode where control of the yaw axis of the payload occurs via movement of the terminal about the roll axis).

In some embodiments, Φ1 can be set to about 5°-15°; Φ2 can be set to about 5°-15°. Any angle measurement may be provided for Φ1 can Φ2, which may be greater than, less than, or equal to about 0 degrees, ±5 degrees, ±10 degrees, ±15 degrees, ±20 degrees, ±25 degrees, ±30 degrees, ±35 degrees, ±40 degrees, ±45 degrees, ±50 degrees, ±55 degrees, or ±60 degrees.

In some embodiments, terminal 300 is initially placed horizontally, with motion along the X, Y and Z axis controlling the movable object and/or the payload in the corresponding X, Y and Z axis. For example, terminal 300's rotating left and right along the Z (yaw) axis or the Y (roll) axis can control the rotation of the payload along the yaw axis and the roll axis, respectively. As such, to the user terminal 300's state is the state of the payload, thereby rendering the control intuitive. Adjusting the user's terminal attitude causes a corresponding change in the payload attitude. The payload attitude may be adjusted via adjustment of the movable object alone, carrier alone, or both the movable object and carrier.

The terminal 300 may tilt left and right at various rates of acceleration and to various extents. The payload's corresponding speed, e.g., rotational speed, may change at the same acceleration rate and extent as terminal 300. Alternatively, a factor or coefficient may be provided that may cause a different speed or acceleration of rotation for the payload.

In some embodiments, the payload may be a camera that may capture video images. The video images can be directly returned to terminal 300 (e.g. a mobile phone) and may be displayed on its screen, thereby providing the user an intuitive and direct feedback of the payload manipulation.

A user can observe the inclination angle of terminal 300 (e.g., a mobile phone). For example, the angle of the terminal can be displayed in graphical form, or in text form, or visually estimated by the user. In some embodiments, the inclination angle of terminal 300 corresponds to the inclination angle of the movable object, the carrier, and/or the payload. In some embodiments, the rotating speed of terminal 300 corresponds to the rotating speed of the movable object, the carrier, and/or the payload. That is, the rotating speed of terminal 300 can determine the rotating speed of the movable object, the carrier, and/or the payload. In some embodiments, the acceleration of rotation of the terminal 300 may correspond to the acceleration of the rotation of the movable object, the carrier, and/or the payload.

In some embodiments, a user can control the position of the payload through the terminal 300 by sliding a finger on a touch screen. The position of the payload may be altered by actuating the movable object and/or the carrier. Thus, the user can cause actuation of the movable object and/or carrier by sliding a finger on a touchscreen of the terminal. For example, a slide to the left on the touch screen can cause the payload (e.g., camera) turn right or left turn, and field of view and hence a feedback image (e.g., image captured by the camera) on the screen can accordingly scroll to the left or the right. A user can choose the payload's response to the user's action. When the sliding stops, the displayed scene on the screen can also stop scrolling.

The scrolling discussed above can be implemented by controlling the payload's (e.g., camera's) pointing direction relative to the scene, through the rotation of the carrier, and/or through the rotation of the movable object (e.g., aircraft). For example, the scene imaged by a camera may be a target of the camera. The payload's target may be a field of view captured by the payload.

In some embodiments, the user's finger sliding or zooming in/out on the screen can correspondingly controls at least one of the following: the distance between the movable object and the target (for example, achieved by the movement of the aircraft), the camera's focal length, the superimposition of the camera's focal length and the distance between the movable object and the target. Accordingly, the feedback image on the screen also appears closing in or pulling away, corresponding to the zoom in/out.

Figure 5:
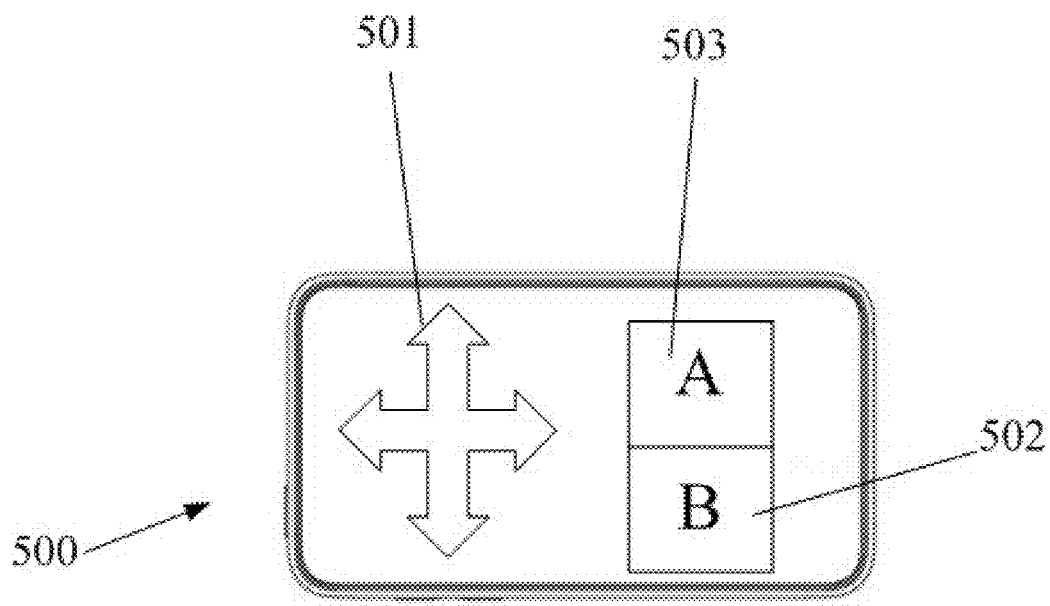
FIG. 5 is a diagram of a software user interface of a button-operated carrier.

FIG. 5 is shows a user interface for a button-operated carrier. A terminal 500 (e.g., a handheld terminal such as iPhone, iPad, Android-based smart phone or tablet computer, etc.) can be equipped with application software which provides a graphical user interface similar to the joystick function to control states of the movable object and/or the carrier. Such controlled states may include movements (e.g., position/orientation, speed, acceleration), pointing, gesture, and the camera's focal length. The terminal may have a user interface showing a directional control area 501, a first mode selection area 503 and a second mode selection area 502.

For example, as shown in FIG. 5, user can touch a selection area 503 to select mode A. In mode A, the cross-shaped touch region 501 can have four directions (up, down, left and right); each controlling the aircraft's pitch and roll. A user can also touch another selection area 502 to select mode B. In mode B, the cross-shaped touch region 501 has four directions (up, down, left and right), each controlling the aircraft's yaw and the camera's focal length (or the superimposition/coupling of the camera's focal length and the distance between the aircraft and the target). Selecting different modes may permit the directional controls to control different states or conditions of the payload (via the movable object and/or the carrier).

It should be noted that, although the number of the sensing signal in different directions are respectively described as "up down", "left right", those skilled in the art appreciate that the description is only relative. Such description may be relative to the orientation of the user interface with respect to a user holding the terminal.

Figure 6:
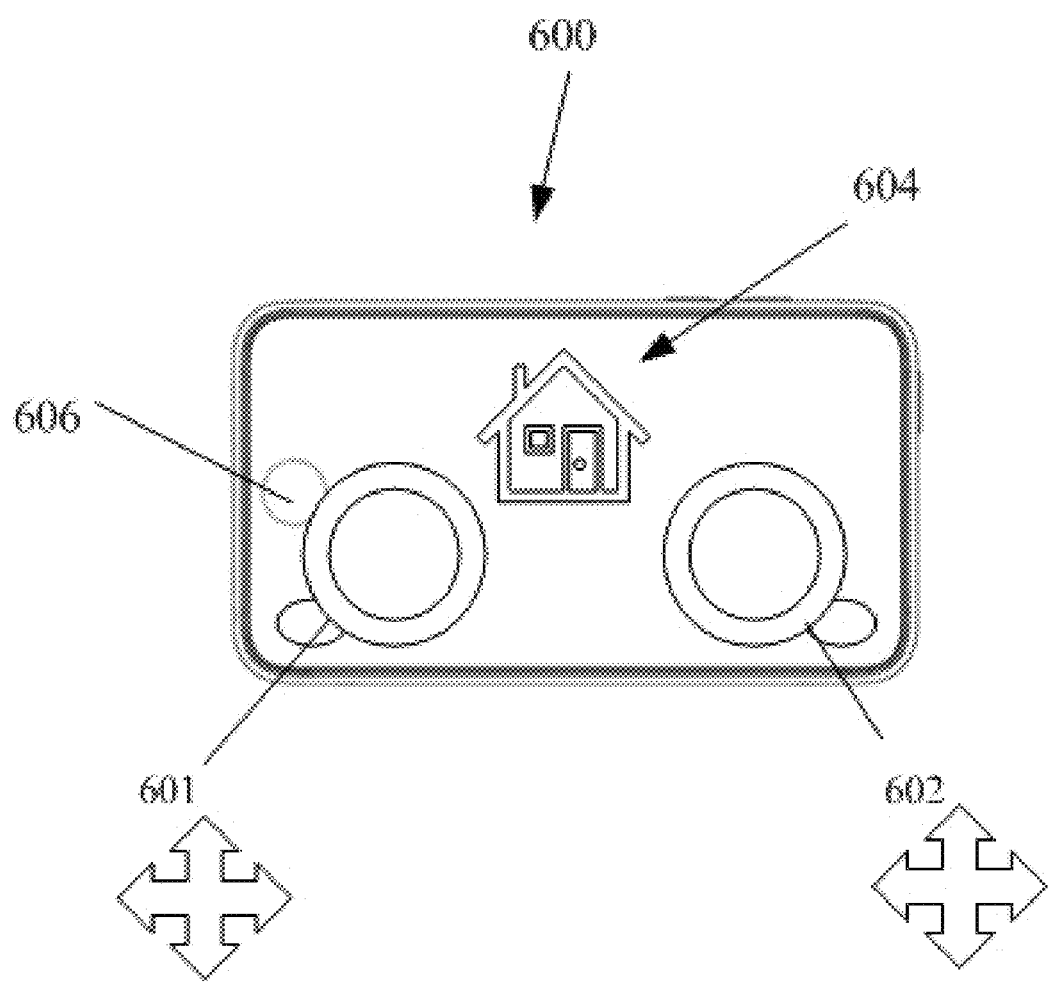
FIG. 6 is a schematic diagram of a virtual joystick.

FIG. 6 illustrates a terminal 600 equipped with touch-screen-implemented virtual control sticks 601 and 602 to control the aircraft. For example, the up and down movement of the left virtual control stick 601 can control the payload's pitch, and the left/right movement of the left visual control stick 601 can control aircraft's yaw. The up and down movement of right virtual control stick 602 can control the camera's focal length (or superimposition/coupling of the camera's focal length and distance between the aircraft the target). The left/right movement of the right virtual control stick 602 can control the aircraft's rolling left/right. If the carrier and the payload is not the three-axis or four-axis type, the degrees of freedom of the virtual control sticks can be reduced accordingly. Any number of virtual control sticks may be provided to correspond to various states or degrees of freedom of the payload via control of the movable object, carrier, and/or payload.

In some embodiments, when the movable object is an aircraft, the virtual control stick enables a user or operator to utilize their conventional aircraft-control experience to use the virtual control stick to control the aircraft's multiple movement dimensions, such as back/forth, left/right, up/down and the pointing direction (e.g., attitude of the aircraft). Although the term "stick" is used, those skilled in the art appreciate that the "stick" is not necessarily rod-shaped. A non-rod-shaped control "stick", according to the preferences of the user, can also control the aircraft's functions. While the "stick" is typically displayed as rod-shaped (often referred to as "joystick"), persons skilled in the art appreciate that the control may be achieved by panning, or other means sensing user signals to control the aircraft's functions. In some instances, a virtual control stick may be shown as an image on a touchscreen that may be responsive to a user's touch. The user's touch may cause the image of the virtual control stick to be altered similar to how a typical "joystick" may look.

Some embodiments can take a different approach to convert input commands into inclination angles of the payload, carrier, and/or movable object. For example, one approach is absolute, which means that the virtual position of the stick or the handheld terminal (e.g., inclination of the handheld terminal) may correspond one-to-one to position of the payload, carrier, and/or movable object. One approach is relative. For example, when the user or operator pushes the left virtual joystick all the way to the left, the payload may be moved about yaw direction left turn. When arriving at the appropriate position, the user or operator releases the virtual joystick to allow it to automatically home to the middle position, which results in the carrier stopping. In some embodiments, the speed of the joystick can control the speed of the aircraft. For example, the faster the movement of the virtual joystick, the faster the payload's speed in the corresponding direction. In other embodiments, the aircraft's speed is determined by the extent of the virtual joystick's movement. For example if the virtual joystick is 'stretched' or 'angled' further, this may correspond to faster movement of the movable object, carrier, or payload.

The terminal 600 can have an image display region 604, which provides image feedback to the user or operator. Displaying the image captured by the payload in the image display region may obviate a need for specialized display device 104 as illustrated in FIG. 1. In FIG. 6, a virtual joystick 601, 602 can generate a state control signal without a state change of handheld terminal 600. This may provide the user or operator with a permanent view of image-display region 604. The image display region may be shown or hidden. For instance, the user can move the terminal about to face the payload, while still controlling the position of the payload in a desired fashion.

In other embodiments, handheld terminal 600 adopts the methods shown in FIG. 1 and FIG. 4 to control the movable object, the carrier and the payload. Position changes of a hand-held terminal 600 may make it difficult for the user or operator to see image-display-region 604, when the attitude of the terminal controls the position of the payload. In these embodiments, the user may adopt the relative control method described above. For example, when the user or operator presses a button 606 of the handheld terminal 600 (which may be a physical button or a virtual button displayed on the screen), a state change of handheld terminal 600 may result in a valid control command. For instance, when the button has been pressed (i.e. is in an 'on' mode), the state change of the terminal may result in a state change of the payload. When the user or operator releases the button 606, the handheld terminal 600 may then be turned back to face the user or operator for the observation of image-display region 604. In this process, state change of handheld terminal 600 does not result in a valid control command. In other words, when the button is pressed again (i.e. is in an 'off' mode), the state change of the terminal will not result in a state change of the payload. In other embodiments, one click of button 606 toggles on the control function, another click toggles off the control function, thereby reducing operating mistake.

In some embodiments, whether state change of handheld terminal 600 results in a valid control command depends on whether the rotational speed of terminal 600 passes a threshold value. For example, when the rotational speed of hand-held terminal 600 is greater than the threshold value, the terminal's state change does not result in a valid control command. As such, the user or operator can rotate handheld terminal 600 to issue a valid control command, and then quickly turn back handheld terminal 600 to observe the image-display region 604, because the quick turning does not result in a valid control command to reverse the previous command. Thus, when the speed of the movement of the terminal falls below a threshold value, a state change of the terminal affects the state of the payload, while when the speed of the movement of the terminal is above a threshold value, the state change of the terminal does not affect the state of the payload. This may filter out unintentional movement or contact.

The threshold value can be set based on the user or operator's preference. For example, a user may define a threshold speed which may determine whether the change of the terminal state affects the state of the payload.

The threshold value control process can be opposite to what is discussed above. For example, when handheld terminal 600 is turned slower (not faster) than a threshold value, the terminal's state changes do not result in a valid control command. As such, the user can rotate handheld terminal 600 at a faster rate to issue a valid control command, and then slowly turn back the terminal in order to observe the image-display region 604. That is, the slow movement in the reverse does not result in a valid control command.

The disclosed technologies herein can provide various software for a user to download multiple applications and functions of terminal 600 (e.g., iPhone, iPad, Android or Windows-based smart phone, or other smart phones, tablets, and terminals). One application software can include different embodiments. For example, the method shown in FIG. 6 utilized a virtual joystick; the methods in FIG. 1 and FIG. 4 utilize the state of the handheld terminal to control the aircraft, the carrier and the payload. A user can choose different embodiments according to personal preference and the operating environment.

As such, users can download the application software to turn a device (e.g., smart phone, tablet, laptop) into a terminal. Smart phones generally have a state sensor. In some embodiments, pre-existing sensors on the device can be used to generate a signal relating to a state of the terminal.

Sensors of higher precision can be added to the device (e.g., smart phone, tablet, laptop) as needed. Devices generally have a signal processing module to convert the state of the user into a control signal. The signal processing module can be implemented in hardware or software. A device can also have a signal transmitter module (e.g., Wi-Fi, Bluetooth, 2G/3G/4G signal, cell phone signal, etc.) to transmit the control signal to the movable objects, carriers, and/or payloads. Separate transmitting module or antenna can be added to the device as needed. Alternatively, the transmitted signal from the device (e.g., smart phone, tablet, laptop) can be amplified by a relay station or a repeater. The device's display screen can serve as a human-machine graphical user interface (GUI) to display feedback images resulting from the transmitted control signals, such as images captures by the payload (e.g., camera) on the aircraft. Videos captured by the payload can also be transmitted back to the device via Wi-Fi, Bluetooth, 2G/3G/4G signals, etc.

Figure 7:
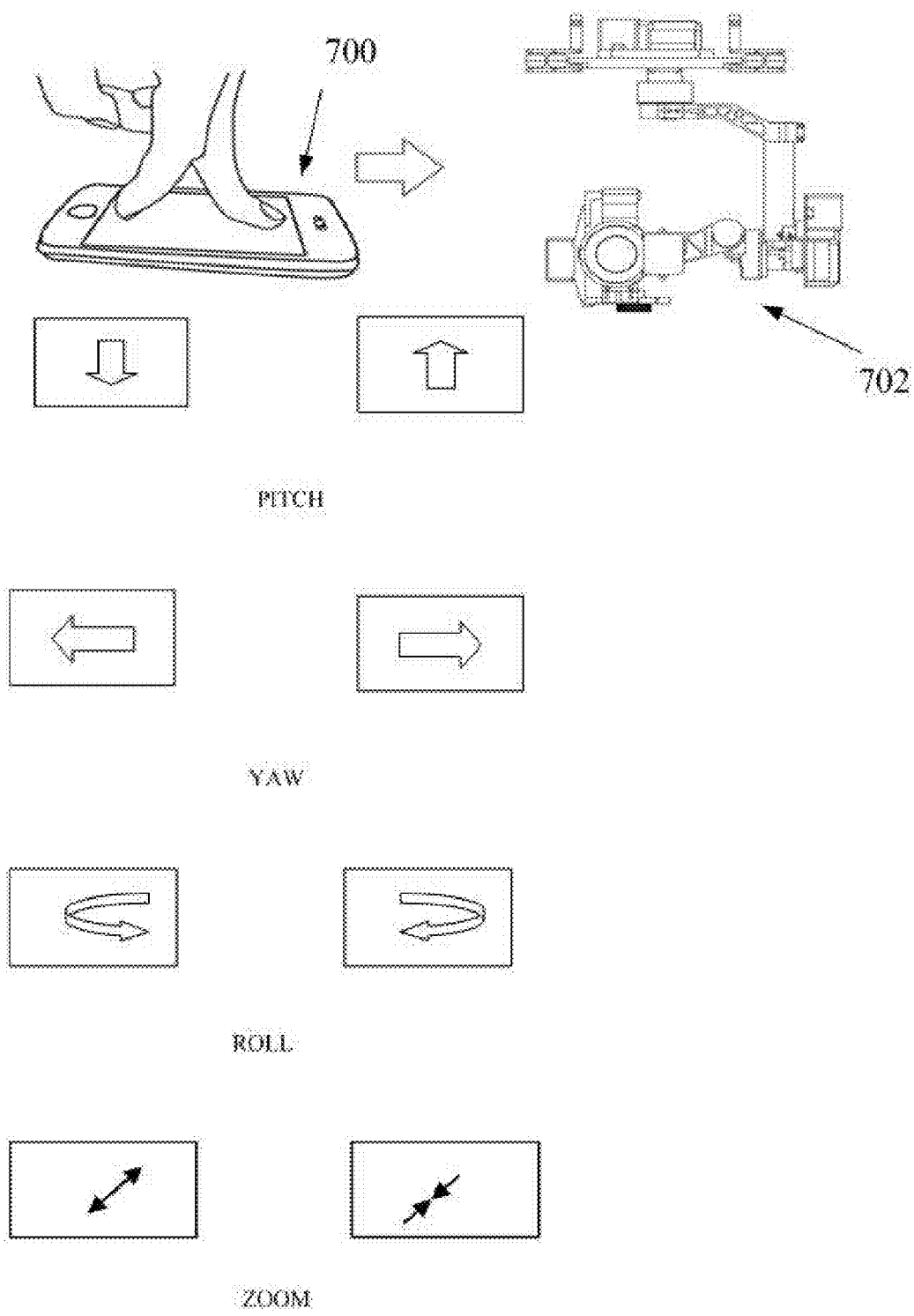
FIG. 7 is a diagram illustrating the method of controlling a state of a payload via a touch implementation.

FIG. 7 demonstrates an embodiment that controls a carrier 702 by the user's finger moving on the screen of a terminal 700, without relying on any graphical interface on the handheld terminal. For example, the state of the carrier and the carried payload's focal length can be controlled by the hand's paddling, circling, or zoom in/out gestures. More specifically, the finger on the screen can be dragging an icon, or simulating movements of the movable object, the carrier or the payload. This embodiment can be implemented using motion-capture technology. For example, as shown in FIG. 7, a single finger sliding up and down on the screen can control the pitch of the movable object and/or the carrier, a single finger sliding left and right on the screen can control the left and right orientation of the movable object and/or carrier, a single finger circling clockwise or counterclockwise on the screen can control the left and right tilt of the movable object and/or the carrier, two fingers pinching and un-pinching (zooming in and out) can control the camera's focal length (or the superimposition/coupling of the camera's focal length and the distance between the aircraft and the target).

In one embodiment, the terminal screen may show an image captured by the payload (e.g., when the payload is an image capturing device). A user may adjust the image displayed on the terminal screen via finger action, as described herein. For example, the user may pinch and un-pinch to zoom in and out of the image displayed on the terminal screen respectively. This may automatically occur without regard to the attitude of the terminal. In another example, a user may swipe the user's finger across the displayed image to move the image. For example, the user may move the user's finger from left to right across the screen, which may result in the image displayed on the screen moving right, and exposing more of the image to the left. This may also automatically occur without regard to attitude of the terminal. The image displayed on the terminal screen may be reflective of the image captured by the payload. Thus, zooming in or out on the terminal screen may cause the image capture device to zoom in or out from a target being imaged, and/or the movable object to get closer or further from the target being imaged. In another example, swiping the finger to display a different portion of the image may cause the image capture device to adjust its angle relative to the target to capture the corresponding different portion of the image. The adjustment of the angle of the image capture device may occur with aid of adjustment of the movable object position and/or carrier position.

The carrier may be actuated in response to movements of the user's fingers on the screen. The carrier, as illustrated, may have one or more frame assemblies that may be used to support the payload. In some instances, the payload may be suspended beneath the movable object via the carrier. Alternatively, the payload may be supported above or to the side of the movable object. In some instances, the payload and/or carrier may be within the movable object. The one or more frame components of the frame assembly may be movable relative to one another. One or more actuators (e.g., motors) may control movements of the frame components. One or more actuators may operate in response to the movement of the user's fingers or any other command signal described elsewhere herein. Thus, a command signal from a terminal (e.g., initiated by a state of the terminal or input from a user) may result in actuation of the one or more actuators of the carrier, thus resulting in control of the orientation/position of the payload about one or more axes of rotation. The command signal may be further processed by a processor, e.g., based on a detected state of a payload, carrier, and/or movable object to generate corresponding motor signals.

The embodiments described above can be implemented using touch screen. In other embodiments, instead of touch screen, the movable object, carrier and/or payload can be controlled by commands generated from images taken by terminal 800 in FIG. 8. For example, a user's hand can perform "stooping", "lifting", "tilt left", "right tilt", "turn left", "turn right", paddling and other gestures to a camera 801 of the terminal 800, in order to control the movable object 804, the carrier and/or the payload. Combinations of one or more input methods discussed herein may be employed. The terminal 800 shown in FIG. 8 can be a laptop, a smart phone, or a tablet computer, etc. The terminal can be handheld or non-handheld (for example, placed on a platform).

The camera 801 of the terminal can be any image capturing device. The camera may include optical sensors, motion sensors, infrared sensors, ultraviolet sensors, or any other type of sensors.

In some embodiments, terminal 800 can capture a user's eye movements via camera 801. The user's finger or other body parts do not have to be in contact with terminal 800. Instead, a tiny camera on terminal 800 can track and capture a user's eye movement to achieve non-contact control.

In some embodiments, terminal 800 captures a user's body posture by the camera 801. For example, the camera 801 can capture movement of the user's arm, leg or head, and then use the captured posture of state to generate a control signal to achieve non-contact control.

Figure 8:
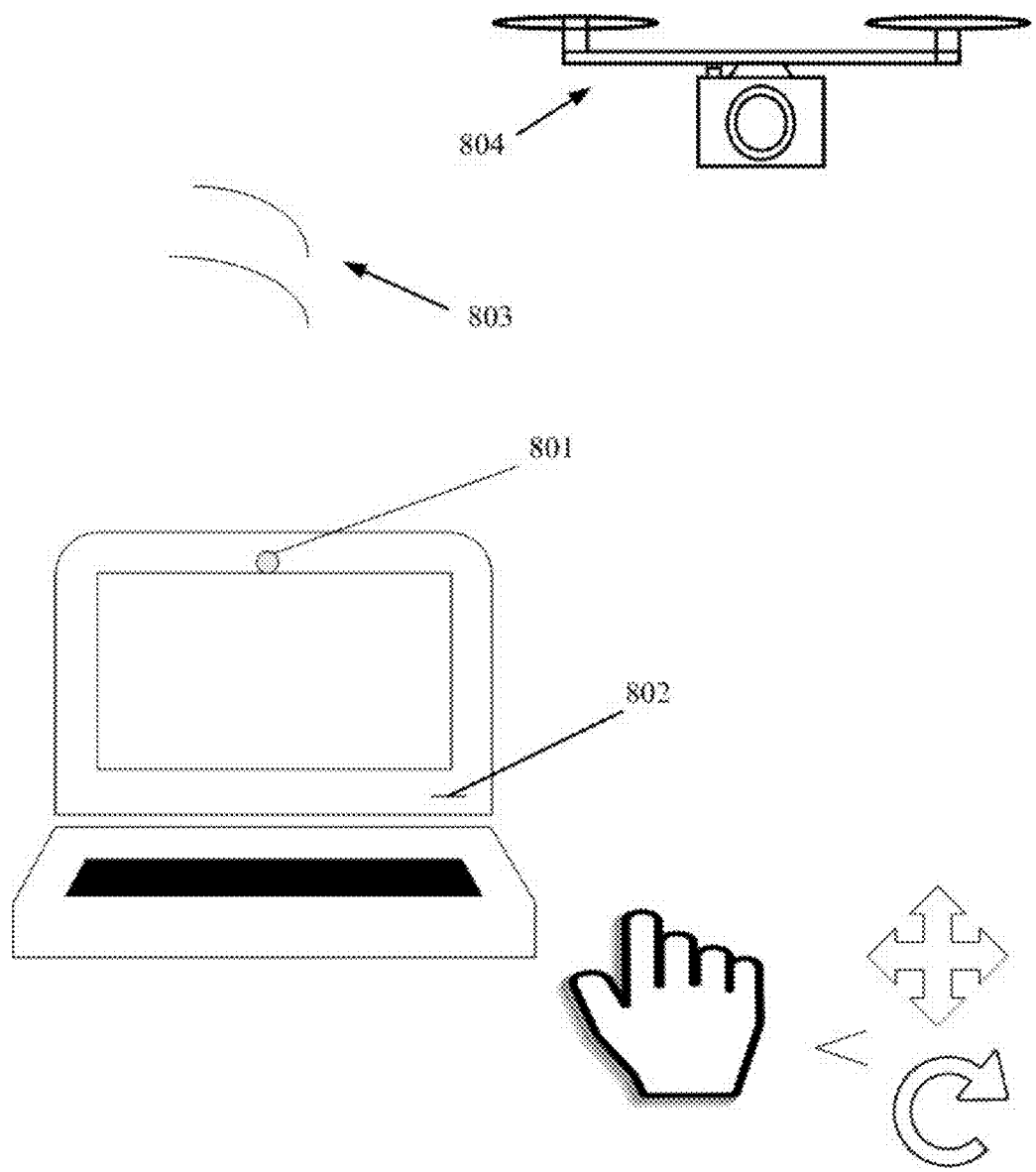
FIG. 8 is a diagram illustrating the method of controlling a state of an object without using a touch implementation.

FIG. 8 illustrates another embodiment wherein an audio detector such as a microphone 802 of the terminal can capture a user's voice commands. The terminal can convert the voice signal into a command signal using voice recognition technology and intelligent terminal processing, and subsequently transmitting command (i.e., control signal 803) to aircraft 804. Specific voice commands are illustrated and described in FIG. 9.

Figure 9A:
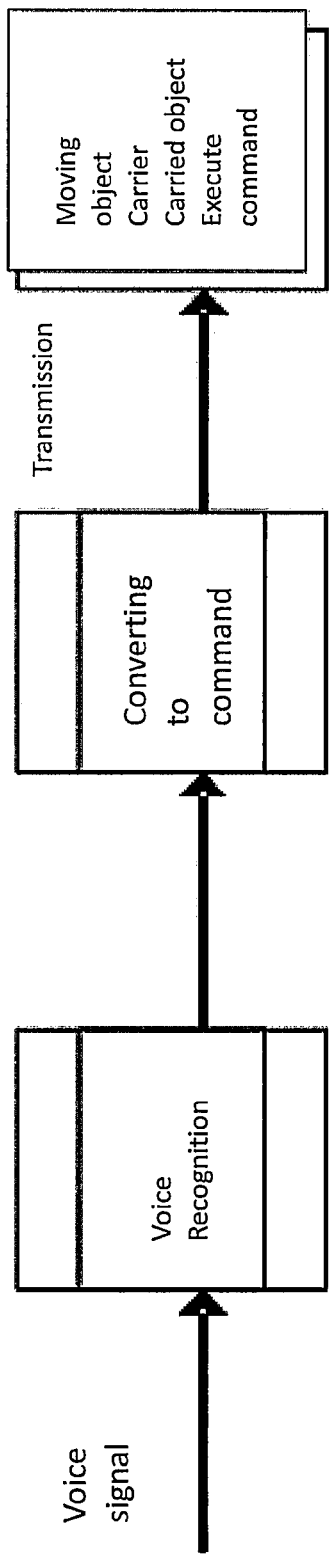
FIG. 9A is a schematic diagram of controlling a state of an object via voice.

FIG. 9 illustrates how the voice control may operate in accordance with an embodiment of the invention. In some embodiments, as shown in FIG. 9A, the control command input can be via voice. For example, the voice commands issued by the user can comprises "left", "right", "upwardly", "downwardly", "stop", "25 degrees to the left", "5 degrees down", "clockwise 30 degrees", "35 degrees, minus 30 degrees, 25 degrees" (relative to the pitch, roll, yaw, absolute position, respectively) and other commands. The voice can be converted into commands by the terminal via voice recognition technology and further processing, with the commands subsequently uploaded to the movable object (e.g., an aircraft) and executed by the movable object, the carrier or the payload.

Figure 9B:
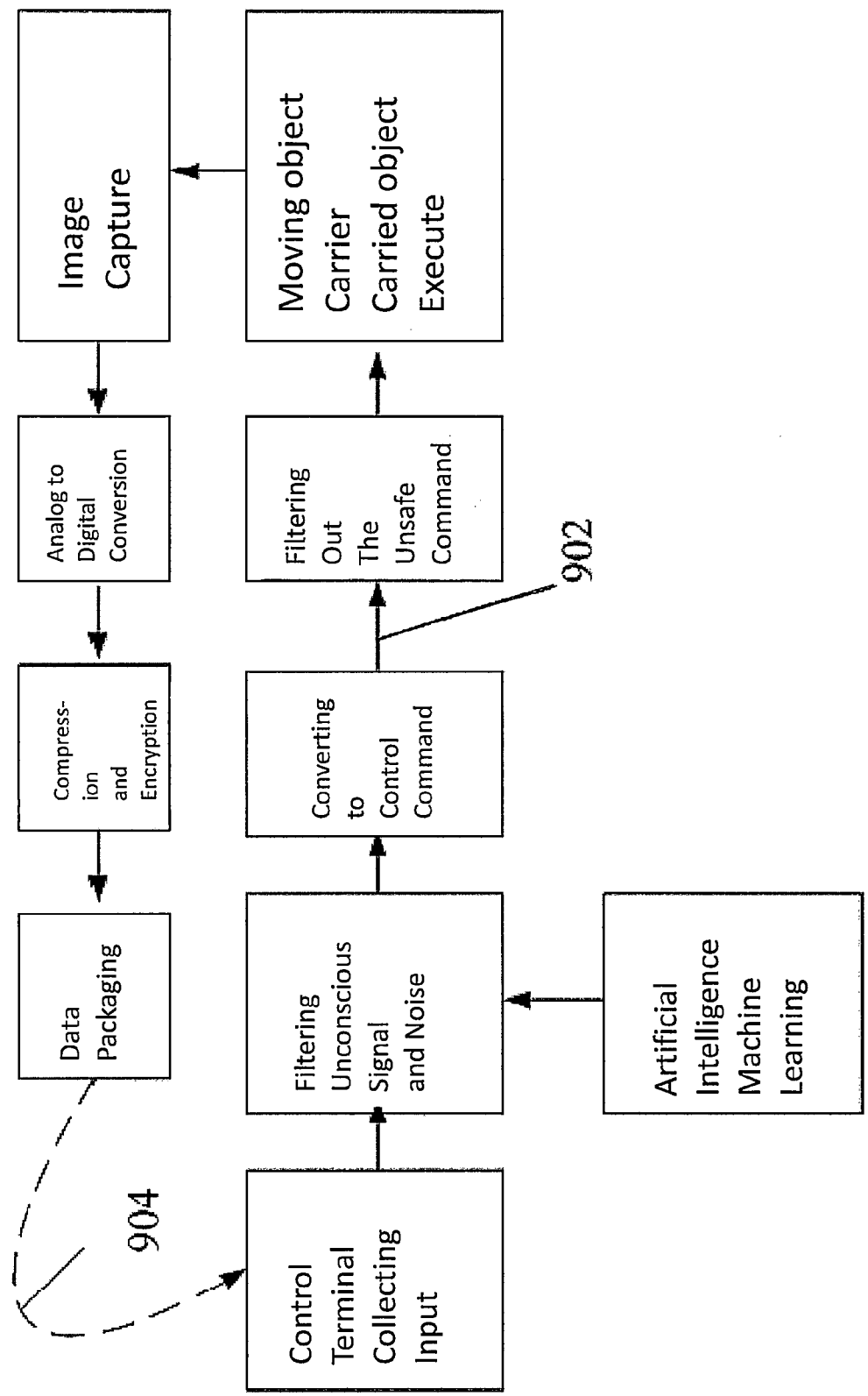
FIG. 9B illustrates a general control method.

FIG. 9B illustrates a more general control method, where the terminal input signal is not limited to voice, but may also include a user's other state signals, such as hand gesture, finger movement, eye movement, head movement, and so on. The terminal can filter out signals generated by a user's unconscious and/or unintended movements, such as a user's unconscious eye movement, neck movement due to fatigue, sound or movement resulting from sneezing or coughing, and so on.

The filtered signal can be converted into control commands and then transmitted to the movable object wirelessly via link 902 (e.g. cell phone signal, Wi-Fi, Bluetooth, or any other form of communication). Auto control device on the movable objects can filter out unsafe commands, such as when the movable objects may the obstacles or commands causing excessive overload. Movable objects, the carrier and/or the payload can execute the commands separately or together. Images resulting from executing the commands can be fed back to terminal 904 via a downlink. Downlink 904 can be achieved by radio. In some embodiments, the terminal can use artificial intelligence and machine learning process as well as a feedback process to improve the filtering of signals generated by unconscious movements.

Using Wi-Fi as an example, the movable objects, the carrier and/or the payload can serve as a wireless communication intervention point (Access Point). It connects with the terminal, resulting in the formation of a Wi-Fi network. In some embodiments, in order to establish an uplink control link 902 and/or create downlink 904, devices at both ends of the link can utilize the authentication and authorization process.

On the movable object, the carrier, and/or the payload, one or more of the following steps can happen: a target image can be captured by the payload (e.g., camera, camcorder), analog to digital conversion (if analog instead of digital data is obtained), compression (for example, using H.264/H.265 protocol compression, using Slice technology to reduce picture delay, using multi-layer technology to enhance the robustness of image transmission, etc.), encryption, data packing and other steps. The signal can then be sent via downlink 904. Similarly, in uplink 902, sensory input at the terminal (e.g., inclination angle) can be converted to commands using special algorithms. The signal can be encrypted as needed before uploading. The signal for uplink can also undergo one or more of the foregoing steps, such as generation of a signal by the sensor, analog to digital conversion, compression, encryption and/or data packing.

Figure 10:
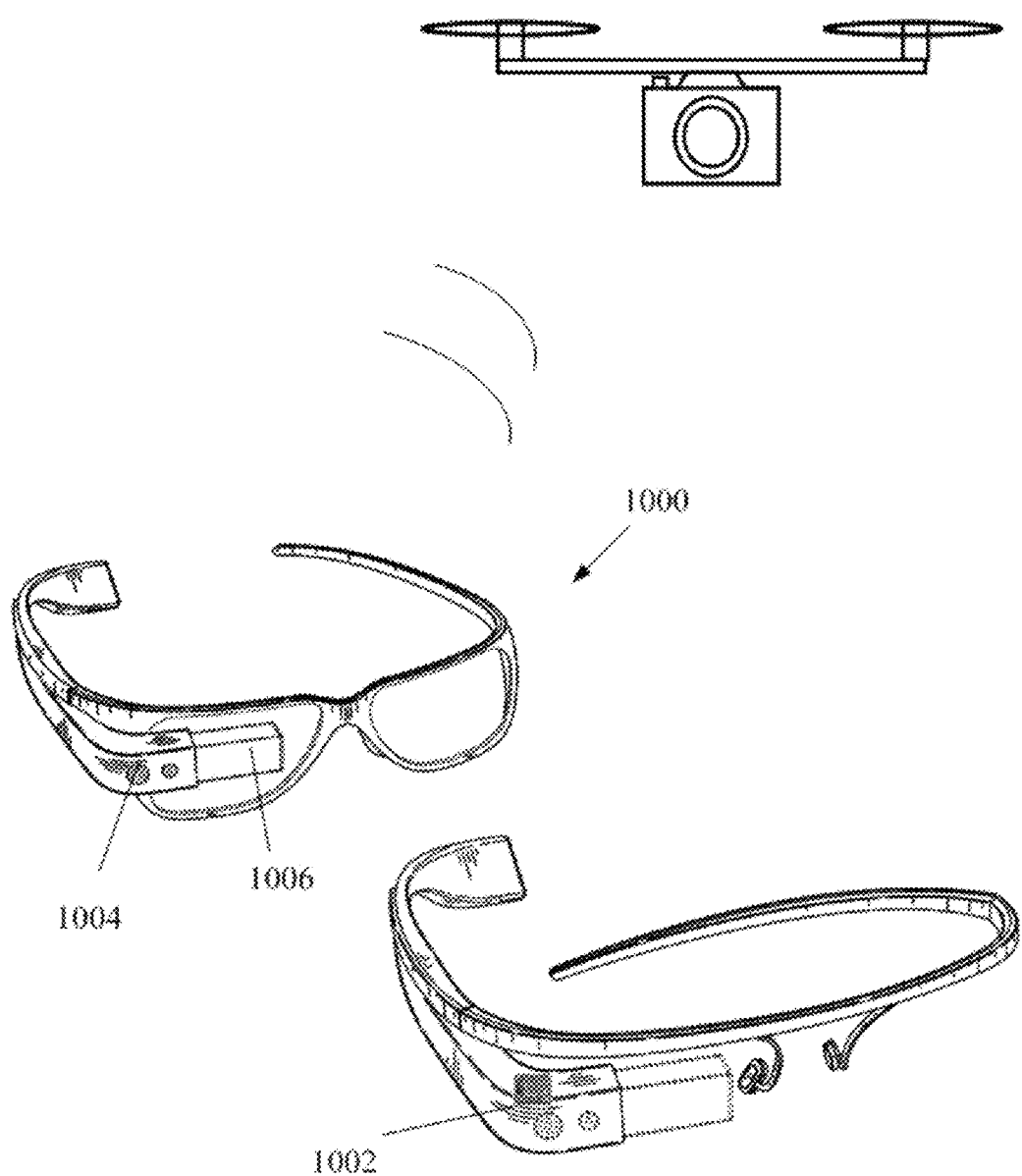
FIG. 10 is a schematic diagram of controlling the state of object via a pair of glasses.

FIG. 10 illustrates a method of controlling an aircraft by using screen-embedded glasses 1000 as the terminal (e.g., Google glasses). Glasses 1000 may include a built-in sensor 1002 (e.g., IMU, or inertial measurement unit) and/or a small camera 1004. Posture change or movements of the head or a neck rotation can control the state of the movable object, the carrier or the payload, e.g., the orientation of a camera's field of view. Images taken by the camera can be transmitted in real time back to a screen 1006 of the glasses. For example, in the case of three-axis carrier, rotation of the user's head in each axis corresponds the carrier's movement in corresponding axis. In some examples, rotation of the user's head about each axis may correspond to movement of a payload in each corresponding axis. Such movement may be effected by actuation of the carrier, the movable object, or a combination thereof.

In some embodiments, the sensor 1002 on the glasses can capture head movement or posture change, and convert the captured information into control signals, and then transmit the control signals to the aircraft via a wireless connection. In other embodiments, a mini camera 1004 on the glasses can determine the head's movement or posture change based on the movement of objects in the surrounding environment. Fusion of information from two sources can result in a more accurate capture of the head's movement or posture change. In other embodiments, a mini camera on glasses 1000 can be used to capture a user's eye movement in order to control the state of the payload.

The glasses can support a variety of wireless connection (such as a radio frequency RF, infrared, Bluetooth, and rapid identification codes, etc.) to identify the relevant equipment, to determine whether the equipment can be manipulated before initiating a control operation. Once the glasses have identified related equipment, such as a movable object and a carrier, an on-screen control panel appear on the glasses' screen. The panel can then be used to control the movable object and the carrier.

Figure 11:
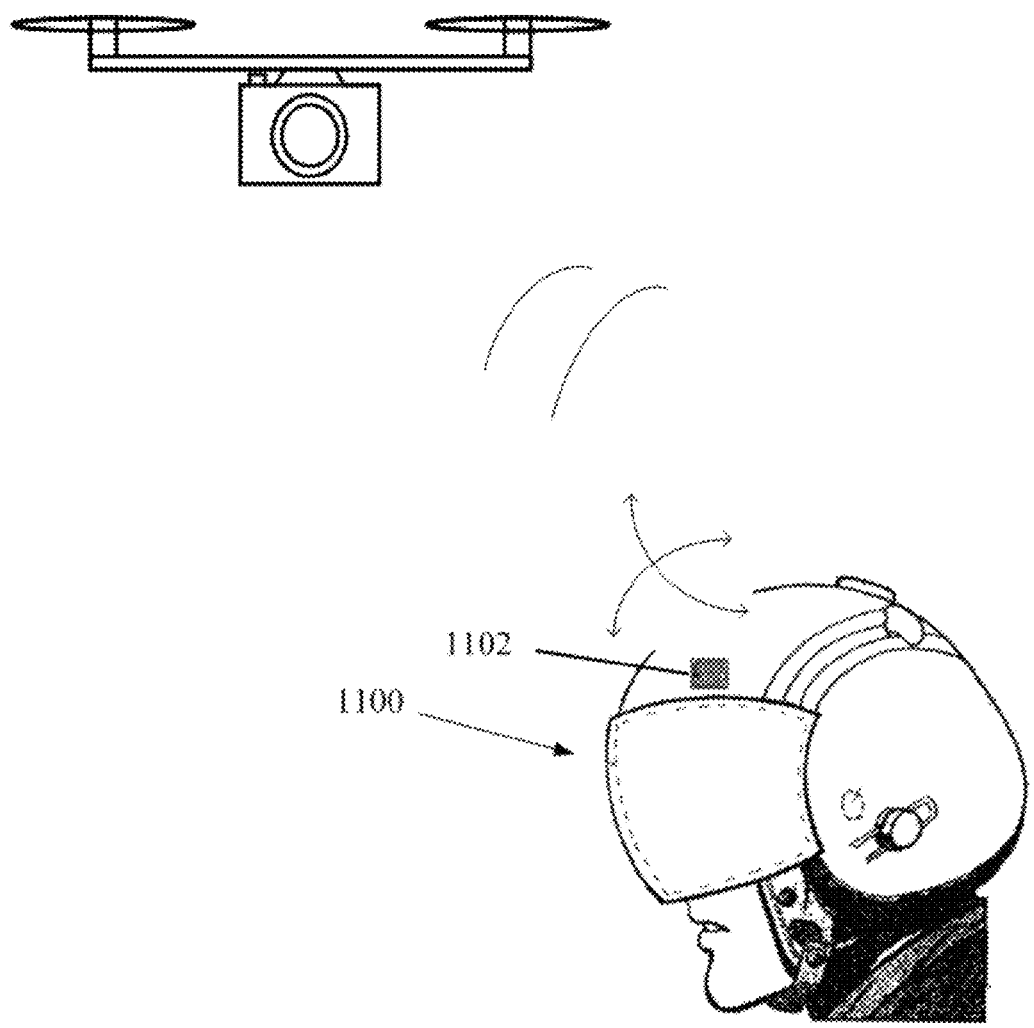
FIG. 11 is a schematic diagram of controlling a state via a helmet.

FIG. 11 illustrates one embodiment wherein the terminal is a helmet 1100 that is used to control the movable object and/or the carrier. A sensor 1102 on the helmet can capture a user's head movement, such as rotation about an axis (e.g., pitch, roll, or yaw rotation), as well as forward and backward movement. Head movement information can then be converted into a control signal and sent to the aircraft in order to control the movement of the movable object and/or the carrier.

Control of the carrier may be coupled with control of the movable object. For example, in some embodiments, this coupling can be full, meaning that helmet's state can be the final state of the payload (e.g., camera's) viewfinder. Specific implementation can be automatically selected by the system, including the movable object's state, its location and automatic compensation by the carrier. In other embodiments, this coupling can be partial. For example, the yaw axis may be completely controlled by the state of the movable object. For a partial coupling, some motions may result in control of one of the movable object or carrier while other motions may result in control of the other of the movable object or carrier.

Figure 12B:
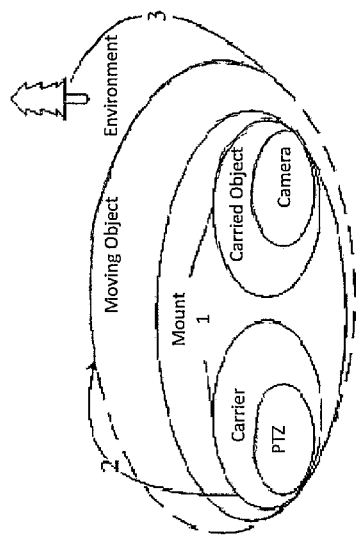
FIGS. 12A-D are diagrams showing a state with respect to the environment.
Figure 12D:
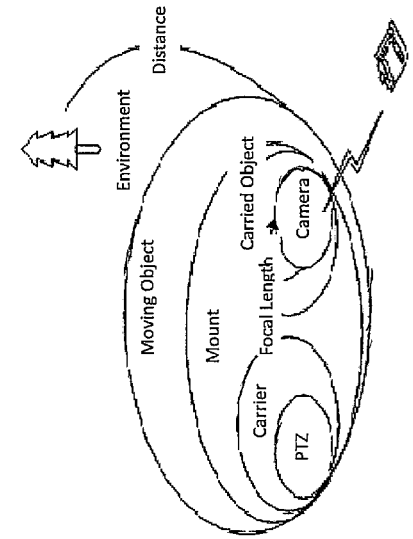
Figure 12A:
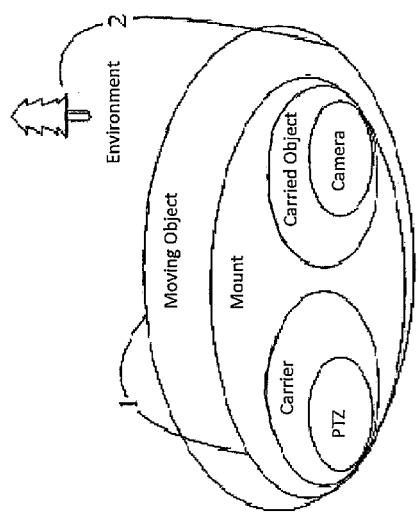

FIGS. 12A-D are diagrams showing a state with respect to a fixed reference frame (e.g., the environment). FIG. 12A demonstrates that the state of the payload can be a superimposition of state "1" (position status of the payload itself with respect to the movable objects) and state "2" (the movable object's state with respect to the environment).

FIG. 12B demonstrates that the state of the payload (e.g., the camera) can be a superimposition of state "1" (position status of the payload itself with respect to the carrier), state "2" (the carrier's state with respect to the movable object), and state "3" (the movable object's state with respect to the environment).

Figure 12C:
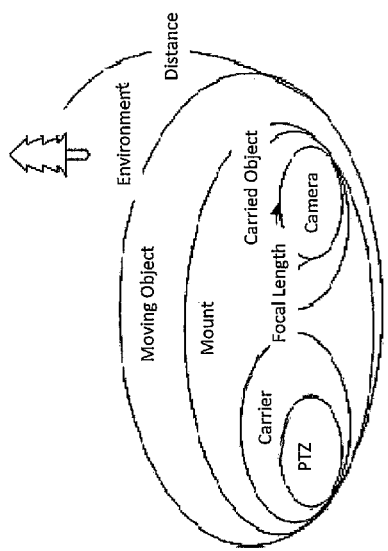

FIG. 12C illustrates that one type of state of the payload (e.g., camera) can be its focal length. The focal length and the movable object's state relative to the environment can be controlled as a superimposition. For example, the focal length of the payload may be adjusted to zoom in or out, while the movable object may move closer or further from a target.

FIG. 12D illustrates that the sliding a user's finger on the touch screen centralized the control of superimposition of the movable object's distance from the target and the camera's focal length.

Figure 13:
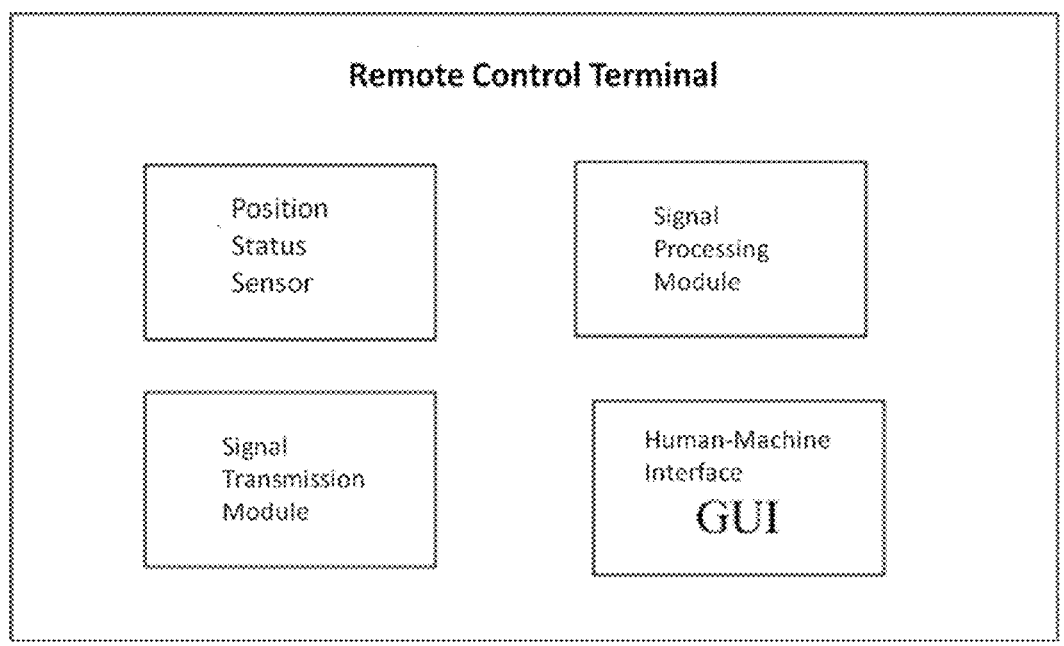
FIG. 13 is a block diagram for a terminal.

FIG. 13 is a block diagram for a terminal. For example, the terminal can include a sensor, a signal processing module, a signal transmitter module, and a human-machine interface. A graphical user interface (GUI) may be provided as part of the human-machine interface. Many of the existing smart phones and tablet computers already have these basic elements. Smart phones and tablet computers can download an application to achieve the function of the terminal.

The sensor may sense a state of the terminal. For example, the sensor may sense an orientation or position of the terminal. The sensor may register audio waves for voice commands. The sensor may register optical signals (e.g., capture images of gestures, eye movements), infrared signals, touch-capacitive signals (e.g., a user touching a touch-screen of the terminal), or any other signals described elsewhere herein. The signal processing module may process and/or modify the signal from the sensor. In some embodiments, the signal processing module may generate a command signal based on the signal from the sensor. The command signal may determine positioning of a payload. In some instances, the signal processing module may determine actuation of a movable object, carrier and/or payload in order to position the payload. A signal transmitter module may be provided. The command signal may be sent to the movable object, carrier and/or payload. This may cause actuation of the respective object, which may result in the desired state of the payload.

In some embodiments, the terminal may include a programmable processor and a memory. The processor may execute one or more steps as provided by non-transitory computer readable media comprising code, logic, or instructions for performing the one or more steps. The memory may store the non-transitory computer readable media. The non-transitory computer readable media may include instructions or algorithms for taking a signal from a sensor and creating a command signal that could cause actuation of the movable object, carrier, and/or payload.

Optionally, the movable object, the carrier, and/or the payload may have a programmable processor and memory as well. Actuation of the movable object (e.g., movement, attitude adjustment, translation, flight, driving) may occur in accordance with non-transitory computer readable media stored in the memory of the movable object, with aid of the programmable processor. Actuation of the carrier (e.g., movement of one or more frame components of the carrier) which may result in a change in position/orientation of the payload with respect to the movable object may occur in accordance with non-transitory computer readable media stored in memory of the carrier, with aid of the programmable processor. Actuation of the payload (e.g., change in camera focal length) may occur in accordance with non-transitory computer readable media stored in a memory of the payload, with aid of the programmable processor. The movable object, carrier, and/or payload may have a transceiver capable of receiving and/or sending signals. For example, the transceiver may receive one or more command signals from the terminal. The transceiver may send feedback signals (e.g., about actuation or positioning, or images captured by the payload) back to the terminal or to another object.

In some applications, such as photography and videography, a rocker or a supporting pole or stick can be used to increase the moving range and view angle of a payload, such as a camera or camcorder, in order to achieve desired image effects.

Figure 14:
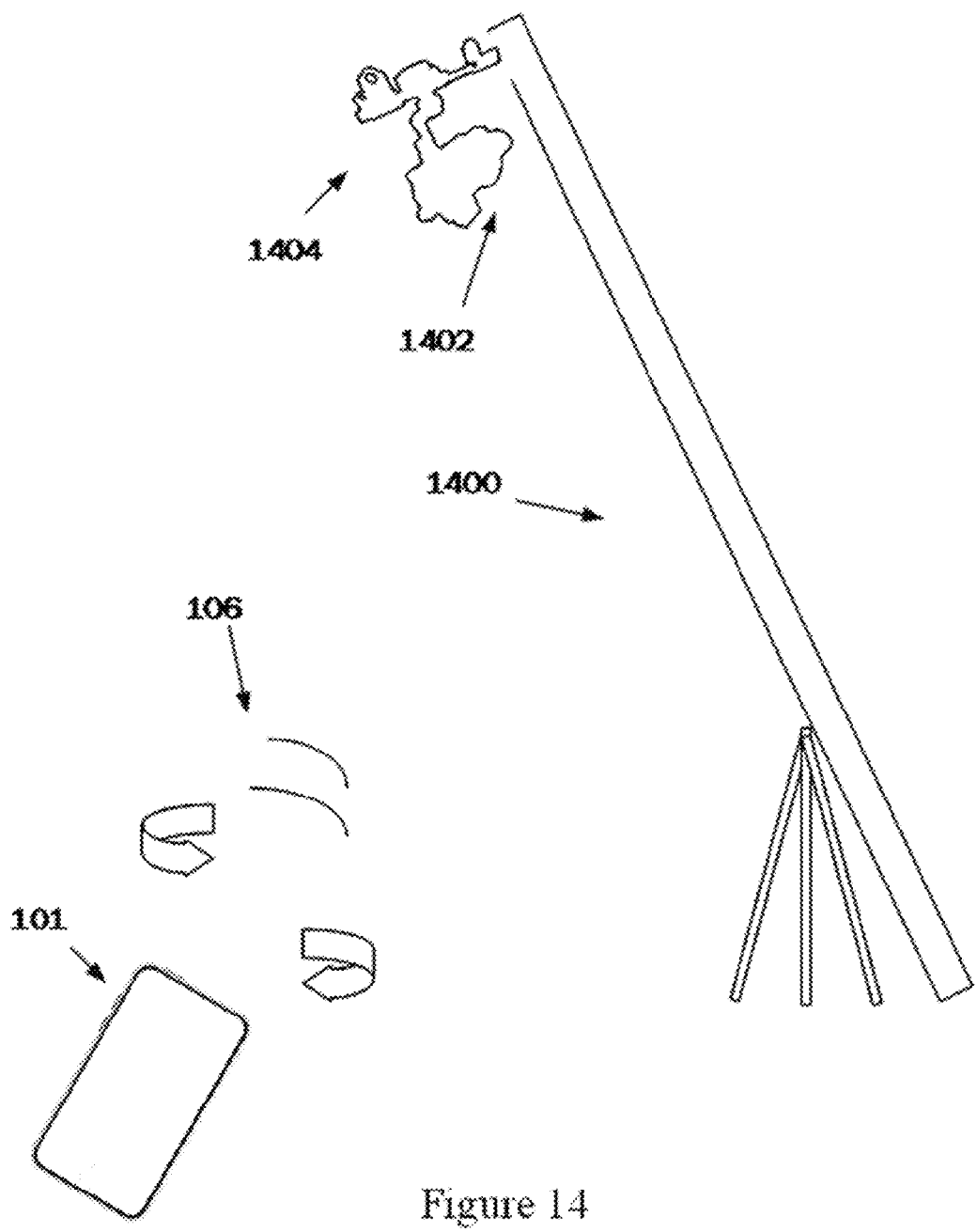
FIG. 14 is a diagram illustrating how in some embodiments a stick-type movable object is controlled via a terminal.

FIG. 14 is a diagram illustrating how in some embodiments a stick-type movable object can be controlled via a terminal 101. In these embodiments, the movable object may be movable arm 1400 (e.g., rocker arm), which can be equipped with carrier 1402. The carrier may be supported at or near an end of the movable arm, while the other end of the movable arm may be fixed to a support. The support may be a static support (e.g., fixed relative to the fixed reference frame) or a dynamic support (e.g., movable relative to the fixed reference frame). The support may be structural, handheld, or any other type of support. The carrier 1402 can have a payload 1404 (e.g., a camera).

A user can control the position and extension of a movable arm 1400, so as to place a camera 1404 at suitable position and angle for photography or cinematography. The same user or another user can use the terminal 101 (e.g., a smart phone or a tablet computer) to control the state of carrier 1402 or payload 1404 (e.g., posture, pointing direction, movement and focal length) wirelessly (e.g. via wireless signal 106) or via cable. Similar to the embodiments previously described, the state can be controlled by the state of terminal 101.

In some embodiments, the movable arm 1400 can be connected to a tripod or other structures in one place. In other embodiments, the movable arm 1400 can be attached to or moved by a vehicle, or slide along a track, or pushed by a user to select shooting scenes. In other embodiments, the user does not even need rocker arm 1400. Instead, the user can hand hold the carrier 1402. In this case, the user is the movable object. The same user's other hand, or another user can use terminal 101 to control the carrier 1402 and/or payload 1404. The movable arm can include a person's arm, a pole, or other supports.

The present disclosure also provides a system that includes a control terminal, a movable object, and a carrier. The control terminal apparatus can include a human-machine graphical interface (GUI), a signal processing module and a radio transmitter circuit.

The present disclosure also provides a set of application software, which can be downloaded by a user to a smart phone, a tablet computer, or a laptop to achieve remote control.

Figure 15:
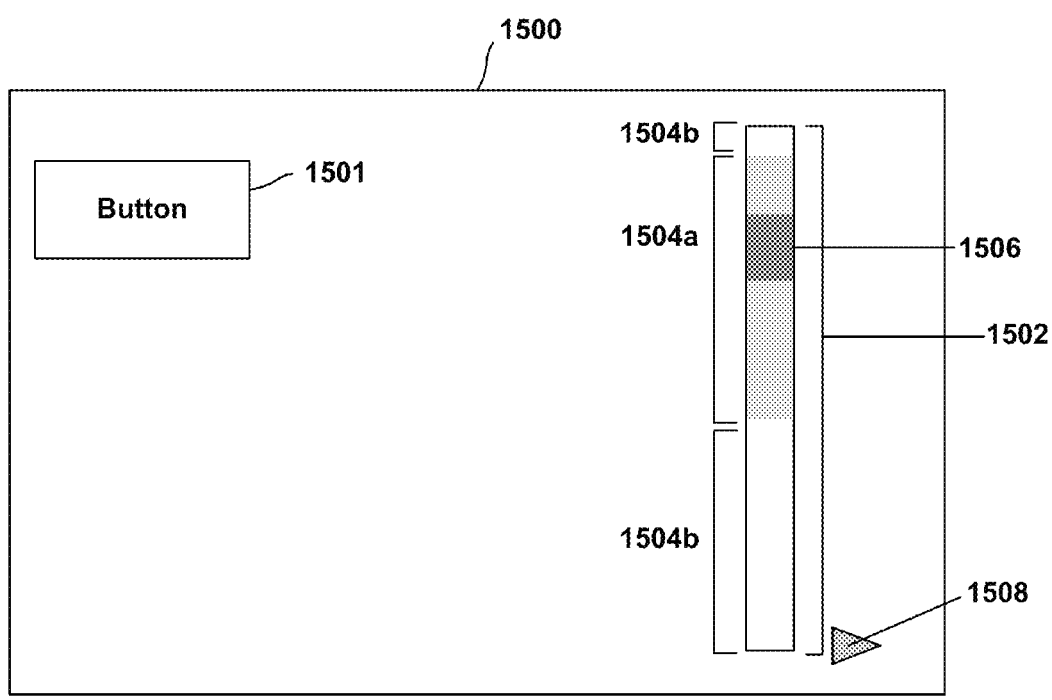
FIG. 15 is an example of a user interface that be shown on the terminal.

FIG. 15 shows an example of a user interface that may be provided on a terminal. The terminal may have a display. The display may show the user interface 1500. In some instances, the user interface may be provided on a touch-screen.

The user interface 1500 may have a visual selector. The visual selector may be an on/off selector 1501. For example, the on/off visual selector may be a button (i.e. virtual button). The visual selector may cause control of the payload, carrier, and/or movable object by the terminal to be turned on or off. When the visual selector is in an on position, adjusting the attitude of the terminal may result in adjusting the attitude of the payload. The attitude of the payload may be adjusted via actuation of the movable object and/or carrier. For example, when the visual selector is in an on position, rotation of the terminal about the pitch axis may be detected and used to control the pitch rotation of the payload. When the visual selector is in an off position, adjusting the attitude of the terminal does not result in affecting the attitude of the payload. The button may be turned on or off by the user touching or selecting the button. In some instances, a user interface an incorporate a mode selector, as described elsewhere herein.

In one example, the terminal is a smartphone or tablet. The on-off button may be displayed on the screen of the smartphone or tablet.

The user interface 1500 may show an attitude range indicator 1502. The attitude range indicator may be a slider bar. The attitude range indicator may have a first region 1504*a* and a second region 1504*b*. The first region may include a range of angles that fall within the complete range of angles displayed. The first region may be displayed as a subset of the entire range of angles in the attitude range indicator. The second region may be the range of angles that are within the overall range of angles but outside the first region. The first region and the second region may be visually discernible from one another. In one example, the first and second regions may be different colors or shadings from one another. For example, the first region may be shaded while the second region is not shaded.

The attitude range indicator 1502 may also include a visual indicator of the attitude of the terminal 1506. The terminal angle indicator 1506 may be displayed anywhere along the attitude range indicator. The terminal angle indicator may correspond to an angle of the terminal with respect to one or more axes of rotation. In some instances, the terminal angle indicator may correspond to an angle of the payload with respect to one or more axes of rotation. Any description herein of the terminal angle indicator applying to a terminal angle may also apply to a payload angle. In some instances, the terminal angle indicator may also be referred to as a payload angle indicator. In one example, if the attitude range indicator is indicative of the pitch angle of the terminal, the terminal angle indicator may show the pitch angle of the terminal. The terminal angle indicator's position along the sliderbar may show the terminal's relative angle with respect to the range of angles.

In some embodiments, when the inclination about an axis is within a certain range, the pitch inclination of the terminal corresponds to the pitch inclination of the payload. For example, when the axis of the terminal and/or payload is within a predetermined range of angles θ, the angles of the terminal and payload for that axis may match. The range of angles θ may have any value. In some instances, the range of angles θ may be preset, may be set by a user, an administrator, or an algorithm. One example of a range may be θ=±7°. In another example, the predetermined range may be θ between −10° and +6°. When the terminal and/or payload angle falls within the predetermined range, fine tuning may be performed. This fine tuning may refer to a one to one correspondence between pitch inclination of the terminal and pitch inclination of the payload (e.g., camera). In some embodiments, a one-to-one correspondence of angle measurements may be provided. In another example, a factor or coefficient may be used (e.g., moving the terminal by one degree results in three degrees of turning by the payload, or moving the terminal by two degrees results in one degree of turning by the payload). A linear relationship may be provided between the angle measurement of the terminal and the payload when within the predetermined range. This may be an angle-to-angle control mode. The predetermined range may correspond to the first region 1504*a* displayed in attitude range indicator 1502.

When the inclination of the axis is outside the range, the pitch inclination of the terminal may correspond to the rotational speed of the payload. For example, if the terminal angle exceeds θ about an axis, the angle of the terminal angle about the axis may correspond to the rotational speed of the payload about the axis. The larger the inclination of the angle, the faster the speed. Alternatively, the speed may be constant once the inclination angle exceeds θ. In one example, when the terminal pitch angle falls outside the predetermined range, the pitch inclination may correspond to the rotational speed of the payload about the pitch axis, or the rotational speed of the payload about the pitch axis may be constant. This may be an angle-to-speed control mode. The area outside the range may correspond to the second region 1504*b* displayed in an attitude range indicator 1502.

In some embodiments, when the terminal angle falls within the predetermined range (corresponding to the first region of the attitude range indicator), the resulting action by the payload may be different from the resulting action by the payload when the terminal angle falls outside the predetermined range (corresponding to the second range of the attitude range indicator). In some embodiments, falling within the predetermined range results in a linear correspondence of the angles between the terminal and payload, while falling outside the predetermined range results in a control of the speed of rotation of the payload (which may or may not correspond to the angle of the terminal). In other examples, both ranges may result in linear correspondence between the terminal angle and payload angle (i.e. but different magnitudes), or rotational control of the payload (i.e. but of different magnitudes or types), or acceleration control of the payload. Thus, inclination control may be separate into two intervals, where the controls vary in some way.

In alternate embodiments, any number of intervals of controls may be provided. In some instances, only a single interval of control is provided, using any of the control techniques described herein. In other embodiments, a multi-interval control may include any number of intervals (e.g., two, three, four, five, six or more intervals). Each interval may have its own control rules. Thus, based on an angle of the terminal, the resulting control of the payload may be different depending on the interval that the terminal angle falls into.

Separation of pitch inclination control into multiple intervals may advantageously permit fine tuning in one interval while performing more substantial rotation in another interval. For example, when two intervals are provided, within the small inclination interval, fine tuning can be performed, whereas more substantial rotation can be easily and quickly controlled based on speed control. In some instances, this method can be used to limit the extent the terminal and/or payload may be rotated about an axis. In some instances, any number of control intervals may be provided which may permit fine tuning or different control over different angles. The multi-interval control may apply to any axis of rotation. For example, the multi-interval control may apply to one, two, or three of the axes of rotations, such as pitch, roll, and/or yaw. In one example, as illustrated in the user interface 1500, the pitch of the payload may be controlled via the terminal. The attitude range indicator 1502 may be oriented to intuitively correspond to the control of the payload. For example, a vertical slider bar may be indicative of pitch rotation control.

The terminal angle indicator 1506 of the user interface 1500 may show the current position of the terminal along the designated angle of rotation. The terminal angle indicator may indicate which control interval is currently being utilized by falling into a designated region 1504*a*, 1504*b* of the attitude range indicator 1502. The payload indicator may indicate whether the rotation has reached the mechanical limit. In some instances, the first region 1504*a* may indicate a fine-tuning region while the second region 1504*b* may indicate where more substantial rotation may occur. The terminal angle indicator's position in the first region or second region may indicate whether fine-tuning control is being utilized or more substantial rotation control is being utilized. As such, users may conveniently know whether they are in an angle-to-angle control mode (e.g., in the first region) or an angle-to-speed control mode (e.g., in the second region).

In some instances, a primary axis of rotation may be controlled and/or indicated by the attitude of the terminal and the angle range indicator, respectively. In some instances, the movement of a payload about a secondary axis of rotation besides the primary axis may be provided. The user interface 1500 may have a secondary angle direction indicator 1508.

In some instances, one, two, or three primary axes of rotation may be provided. A primary axis may include any axis of rotation that is directly controlled by a corresponding angle of the terminal about that axis. A primary axis may optionally include an attitude range indicator on the user interface indicative of the position or type of control about that primary axis of rotation. In some instances, zero, one, or two secondary axes of rotation may be provided.

Optionally, movement of a payload about a primary axis of rotation may be performed by the carrier. In some embodiments, movement of the payload about the primary axis of rotation may be performed by movement of the movable object or a combination of motion by the carrier and the movable object. Movement of a payload about a secondary axis of rotation may be performed by the movable object. In some embodiments, movement of the payload about the secondary axis of rotation may be performed by movement of the carrier or a combination of motion by the carrier and the movable object.

In one example, a primary axis of rotation may be a roll axis. The secondary angle of rotation may be a yaw axis. This may be realized by using the yaw movement of the movable object (e.g., aircraft). When the rotation of the terminal along the roll axis exceeds a certain angle range β, the angle may start rotation about a yaw axis. The angle range β may be referred to as a dead zone, to prevent the unwanted roll rotation caused by the intentional pitch rotation of the terminal. The speed of rotation can be proportionate to the rotation angle around the roll axis, or it can be constant. For example, when β=±15°. The secondary angle direction indicator 1508 may used to show the direction the payload is traveling about the secondary axis. For example, secondary angle direction indicator may be an arrow. An arrow at the bottom right may show that the payload (via carrier and/or movable object) is rotating around the yaw axis toward the left, and an arrow at the bottom left may show that the payload is rotating about the yaw axis toward the right. Optionally, such directions corresponding to indicators may be switched. In some instances, the indicators may indicate that such rotation about the secondary axis is occurring at a constant speed.

Figure 16:
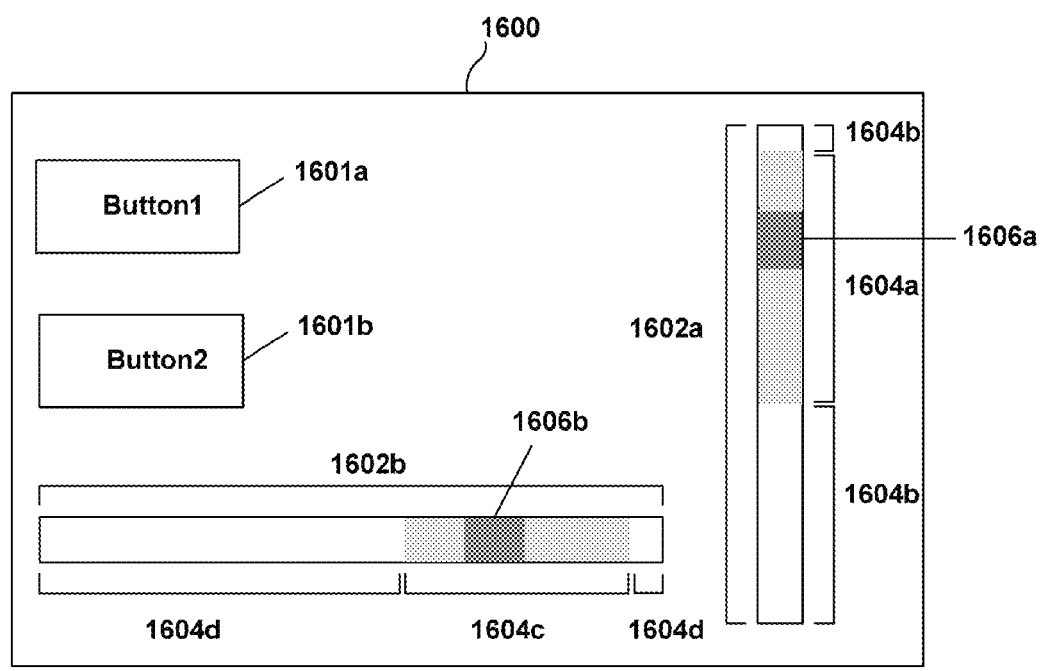
FIG. 16 is another example of a user interface that can be shown on the terminal.

FIG. 16 shows another example of a user interface that may be displayed on the terminal. The display of a terminal may show the user interface 1600. In some instances, the user interface may be provided on a touchscreen. The user interface may show options for control about multiple axes of rotation.

The user interface 1600 may have a plurality of visual selectors. The visual selectors may be an on/off selectors 1601a, 1601b for different axes of rotation. For example, multiple on/off buttons may be provided. The visual selectors may cause control of the payload, carrier, and/or movable object by the terminal to be turned on or off, as described elsewhere herein. For example, when a first visual selector 1601a is in an on position, rotation of the terminal about the pitch axis may be detected and used to control the pitch rotation of the payload. When the first visual selector is in an off position, adjusting the pitch angle of the terminal does not result in affecting the pitch angle of the payload. When a second visual selector 1601b is in an on position, rotation of the terminal about the yaw axis may be detected and used to control the yaw rotation of the payload. When the visual selector is in an off position, adjusting the yaw angle of the terminal does not result in affecting the yaw angle of the payload. The buttons may be turned on or off by the user touching or selecting the button. In some instances, only one of the visual selectors may be in an on position at a time (i.e., only one axis of rotation of the payload may be controlled at a time). Alternatively, multiple visual selectors may be simultaneously in an on position (i.e., multiple axes of rotation of the payload may be controlled at a time). In some instances, one axis of rotation may be controlled so that the adjustment of the angle of the terminal only affects the payload about the one axis of rotation, regardless of how the terminal is moved. Alternatively, two or three axes of rotation may be controlled so that adjustment of the angel of the terminal affects the payload about the two or three angles respectively.

The user interface 1600 may show multiple attitude range indicators 1602a, 1602b. The attitude range indicators may be slider bars. The slider bars may be oriented in different directions. The slider bars may be oriented in an intuitive manner to reflect the axes of rotations. For example, a slider bar that is oriented vertically 1602a may control movement about a pitch axis, while a slider bar that is oriented horizontally 1602b may control movement about a yaw axis. Optionally, curved slider bars may be shown indicative of control about a roll axis.

The attitude range indicators may have a first region 1604a, 160c and a second region 1604b, 1604d. The first and second regions may have characteristics as described elsewhere herein.

The attitude range indicators 1602a, 1602b may also include visual indicators of the attitude of the payload 1606a, 1606b. The terminal angle indicators 1606a, 1606b may be displayed anywhere along the attitude range indicators. The terminal angle indicators may correspond to an angle of the terminal with respect to the axis of rotation for the corresponding attitude range indicator. For example, if the attitude range indicator is indicative of the pitch angle of the payload and/or terminal, the terminal angle indicator may show the pitch angle of the payload and/or terminal. If the attitude range indicator is indicative of the yaw angle of the payload and/or terminal, the terminal angle indicator may show the yaw angle of the payload and/or terminal. If the attitude range indicator is indicative of the roll angle of the payload and/or terminal, the terminal angle indicator may show the roll angle of the payload and/or terminal. The terminal angle indicator's position along the sliderbar may show the payload and/or terminal's relative angle with respect to the range of angles.

The terminal angle indicators 1606a, 1606b may fall into one or more control intervals 1604a, 1604b, 1604c, 1604d of the attitude range indicators. When multiple attitude range indicators are provided, the terminal angle indicators may fall into angle-to-angle control regions, and/or angle-to-speed control regions. In some instances, a terminal angle indicator may fall into angle-to-angle control regions about multiple rotational axes, into angle-to-speed control regions about multiple rotational axes, or into a combination of angle-to-angle control regions and angle-to-speed control regions over the multiple rotational axes.

Any steps described herein may be performed with aid of a processor. For example, analysis, determination, calculation, display, and/or signal processing steps may be performed with aid of a processor. The processor may perform steps in accordance with computer readable media. The computer readable media may include tangible and/or non-transitory computer readable that may include code, logic, or program instructions to perform the one or more steps. The processors may be implemented on any objects or environments (e.g., payload, carrier, movable object, external object, terminal, cloud) or combination of objects.

All references cited in the description are hereby incorporated by reference in their entirety. While the disclosure has been described with respect to a limited number of embodiments, those skilled in the art, having benefit of this disclosure, will appreciate that other embodiments can be advised and achieved which do not depart from the scope of the description as disclosed herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of controlling positioning of a payload, the payload being supported by a carrier on an unmanned aerial vehicle (UAV) or on a living subject, the payload being movable relative to the UAV or the living subject via the carrier about a plurality of axes of rotation, the carrier comprising a plurality of frame components and a plurality of actuators, the plurality of frame components being connected to one another to form a multi-axis gimbal, said method comprising:
receiving, at a receiver positioned on the carrier or the UAV, a signal from a terminal that is remote to (i) the UAV or the living subject, (ii) the carrier, and (iii) the payload, wherein the signal from the terminal is generated based on a user input to the terminal indicative of a mode selection from a plurality of modes having a different number of user controllable axes of rotation of the carrier, said plurality of modes including a single-axis user controllable mode and a multi-axis user controllable mode;
calculating, with aid of one or more processors, an angle or speed by which the payload is to be rotated about at least one axis of rotation based on (1) a user-generated movement on the terminal and (2) the mode selection;
generating a command signal to move the payload, based on the calculation; and
moving the payload about the at least one axis of rotation via movement of one or more frame components driven by one or more actuators of the carrier in response to the command signal.

2. The method of claim 1, wherein the carrier is on the UAV, and wherein the payload is moved relative to the UAV.

3. The method of claim 2, wherein the user-generated movement includes rotating the terminal about its roll, pitch, or yaw axis.

4. The method of claim 3, wherein rotating the terminal about a given axis results in rotation of the payload about a corresponding axis of the payload.

5. The method of claim 1, wherein the terminal is a handheld terminal.

6. The method of claim 1, wherein the terminal has a screen that serves as an image display device.

7. The method of claim 1, wherein the payload is an image capturing device.

8. The method of claim 1, wherein the gimbal comprises at least three frame components that are configured to pivot about three axes which are orthogonal to one another, and wherein the payload is movable via the carrier about the three axes, at least two of which remain orthogonal to one another throughout movement of the payload.

9. The method of claim 1, wherein the user-generated movement includes user finger movement on the terminal.

10. The method of claim 1, wherein the command signal is generated based on an attitude of the payload.

11. A carrier for positioning a payload, said carrier comprising:
a plurality of frame components configured to be attached to an unmanned aerial vehicle (UAV) or a living subject, said plurality of frame components further being configured to support a payload, wherein the payload is movable relative to the UAV or the living subject via actuation of the plurality of frame components about a plurality of axes of rotation, wherein the plurality of frame components are connected to one another to form a multi-axis gimbal; and one or more actuators configured to respond to a command signal to actuate one or more frame components to effect movement of the payload relative to the UAV or the living subject about at least one axis of rotation at an angle or speed calculated based on a signal from a terminal,
wherein the terminal (1) is remote relative to (i) the UAV or the living subject, (ii) the frame assembly, and (iii) the payload, (2) obtains a user input indicative of a mode selection from a plurality of modes having a different number of user controllable axes of rotation of the carrier, said plurality of modes including a single-axis user controllable mode and a multi-axis user controllable mode, and (3) generates the signal based on the mode selection and a user-generated movement on the terminal.

12. The carrier of claim 11, wherein the single-axis user controllable mode controls rotation about a pitch axis only.

13. The carrier of claim 11, wherein the multi-axis user controllable mode controls rotation about a pitch axis and a yaw axis.

14. The carrier of claim 11, wherein the user-generated movement includes rotating the terminal about its roll, pitch, or yaw axis.

15. The carrier of claim 14, wherein rotating the terminal about a given axis results in rotation of the payload about a corresponding axis of the payload.

16. The carrier of claim 11, wherein the payload is an image capturing device.

17. The carrier of claim 11, wherein the gimbal comprises at least three frame components that are configured to pivot about three axes which are orthogonal to one another, and wherein the payload is movable via the carrier about the three axes, at least two of which remain orthogonal to one another throughout movement of the payload.

18. A remote terminal configured to control positioning of a payload supported by a carrier that is configured to be attached to an unmanned aerial vehicle (UAV) or a living subject, said terminal comprising:
(a) a device that receives a user input indicative of a mode selection from a plurality of modes having a different number of user controllable axes of rotation provided by the carrier, said plurality of modes including a single-axis user controllable mode and a multi-axis user controllable mode; and one or more processors that generates a signal based on the mode selected; and
(b) a communication unit that transmits the signal to the carrier or the UAV, wherein the carrier comprises (1) a plurality of frame components configured to support the payload, wherein the payload is movable relative to the UAV or the living subject via actuation of the plurality of frame components about a plurality of axes of rotation, wherein the plurality of frame components are connected to one another to form a multi-axis gimbal; and (2) one or more actuators configured to respond to a command signal to actuate one or more frame components to effect movement of the payload relative to the UAV or the living subject about at least one axis of rotation at an angle or speed calculated based on (1) the signal transmitted by the communication unit and (2) a user-generated movement on the terminal.

19. The remote terminal of claim 18, wherein the carrier is on the UAV, and wherein the payload is movable relative to the UAV.

20. The remote terminal of claim 18, wherein the user-generated movement includes rotating the terminal about its roll, pitch, or yaw axis.

21. The remote terminal of claim 20, wherein rotating the terminal about a given axis results in rotation of the payload about a corresponding axis of the payload.

22. The remote terminal of claim 18, wherein the remote terminal is a handheld terminal.

23. The remote terminal of claim 18, further comprising a screen that serves as an image display device.

24. The remote terminal of claim 18, wherein the payload is an image capturing device.

25. The remote terminal of claim 18, wherein the gimbal comprises at least three frame components that are configured to pivot about three axes which are orthogonal to one another, and wherein the payload is movable via the carrier about the three axes, two of which remain orthogonal to one another throughout movement of the payload.

26. The remote terminal of claim 18, wherein the signal of (a) generated is indicative of the user input.

27. The remote terminal of claim 18, wherein the command signal of (b) is generated based on an attitude of the payload.

28. A system for positioning a payload, said system comprising:
an unmanned aerial vehicle (UAV);
a carrier configured to be attached to the UAV, wherein said carrier comprises a plurality of frame components configured to support a payload, wherein the payload is movable relative to the UAV via actuation of the plurality of frame components about a plurality of axes of rotation using one or more actuators, wherein the plurality of frame components are connected to one another to form a multi-axis gimbal;
a terminal remote relative to (i) the UAV, (ii) the carrier, and (iii) the payload, wherein said terminal is configured to obtain a user input indicative of a mode selection from a plurality of modes having a different number of user controllable axes of rotation of the carrier, said plurality of modes including a single-axis user controllable mode and a multi-axis user controllable mode; and
one or more processors configured to: (1) calculate an angle or speed by which the payload is to be rotated about at least one axis of rotation based on (i) a user-generated movement on the terminal and (ii) the mode selection; and (2) generate a command signal to move the payload based on the calculation, wherein the one or more actuators of the carrier are configured to drive one or more frame components to move the payload about at least one axis of rotation in response to the command signal.

29. The system of claim 28, wherein the one or more processors are onboard the UAV or the carrier.

30. The system of claim 28, wherein the user-generated movement includes user finger movement on the terminal.

* * * * *